(12) United States Patent
Ishiga

(10) Patent No.: US 8,059,910 B2
(45) Date of Patent: Nov. 15, 2011

(54) IMAGE PROCESSING METHOD FOR REMOVING NOISE FROM AN IMAGE

(75) Inventor: Kenichi Ishiga, Yokohama (JP)

(73) Assignee: Nikon Corporation, Tokyo (JP)

( * ) Notice: Subject to any disclaimer, the term of this patent is extended or adjusted under 35 U.S.C. 154(b) by 1096 days.

(21) Appl. No.: 11/886,325

(22) PCT Filed: Mar. 31, 2006

(86) PCT No.: PCT/JP2006/306836
§ 371 (c)(1),
(2), (4) Date: Sep. 14, 2007

(87) PCT Pub. No.: WO2006/106919
PCT Pub. Date: Oct. 12, 2006

(65) Prior Publication Data
US 2008/0199100 A1    Aug. 21, 2008

(30) Foreign Application Priority Data
Mar. 31, 2005    (JP) .................................. 2005-101545

(51) Int. Cl.
*G06K 9/40*    (2006.01)
(52) U.S. Cl. ........ 382/263; 382/260; 382/261; 382/262; 382/264; 382/275
(58) Field of Classification Search .................... 382/263
See application file for complete search history.

(56) References Cited

U.S. PATENT DOCUMENTS

| | | | |
|---|---|---|---|
| 4,523,230 A | | 6/1985 | Carlson et al. |
| 5,109,425 A | * | 4/1992 | Lawton .......................... 382/107 |
| 5,461,655 A | | 10/1995 | Vuylsteke et al. |
| 5,467,404 A | * | 11/1995 | Vuylsteke et al. ............. 382/274 |
| 5,526,446 A | * | 6/1996 | Adelson et al. ................ 382/275 |
| 5,729,631 A | * | 3/1998 | Wober et al. ................... 382/232 |
| 5,799,111 A | * | 8/1998 | Guissin .......................... 382/254 |
| 5,799,112 A | * | 8/1998 | de Queiroz et al. ............ 382/254 |
| 5,805,721 A | * | 9/1998 | Vuylsteke et al. ............. 382/128 |

(Continued)

FOREIGN PATENT DOCUMENTS

JP        A 63-172576        7/1988

(Continued)

OTHER PUBLICATIONS

Tomoo, Mitsunaga, "Image Processing Apparatus and Method, and Program", Sep. 11, 2006, English Translation of Patent Abstracts of Japan 2006-310999, p. 1-70.*

(Continued)

*Primary Examiner* — Jason M Repko
*Assistant Examiner* — Gandhi Thirugnanam
(74) *Attorney, Agent, or Firm* — Oliff & Berridge, PLC

(57) ABSTRACT

An image processing method for removing noise contained in an image includes: inputting an original image constituted with a plurality of pixels; generating a plurality of band-limited images, resolution levels of which are lowered in sequence, by executing a specific type of band pass filter processing on the original image; extracting a high-frequency component from each of the band-limited images by executing high-pass filter processing on the band-limited images; extracting a noise component contained in each of the band-limited images by separating the noise component through nonlinear conversion processing executed on the extracted high-frequency component; and removing the noise in the original image based upon the extracted noise component in each band-limited image.

10 Claims, 15 Drawing Sheets

U.S. PATENT DOCUMENTS

Figure 1:
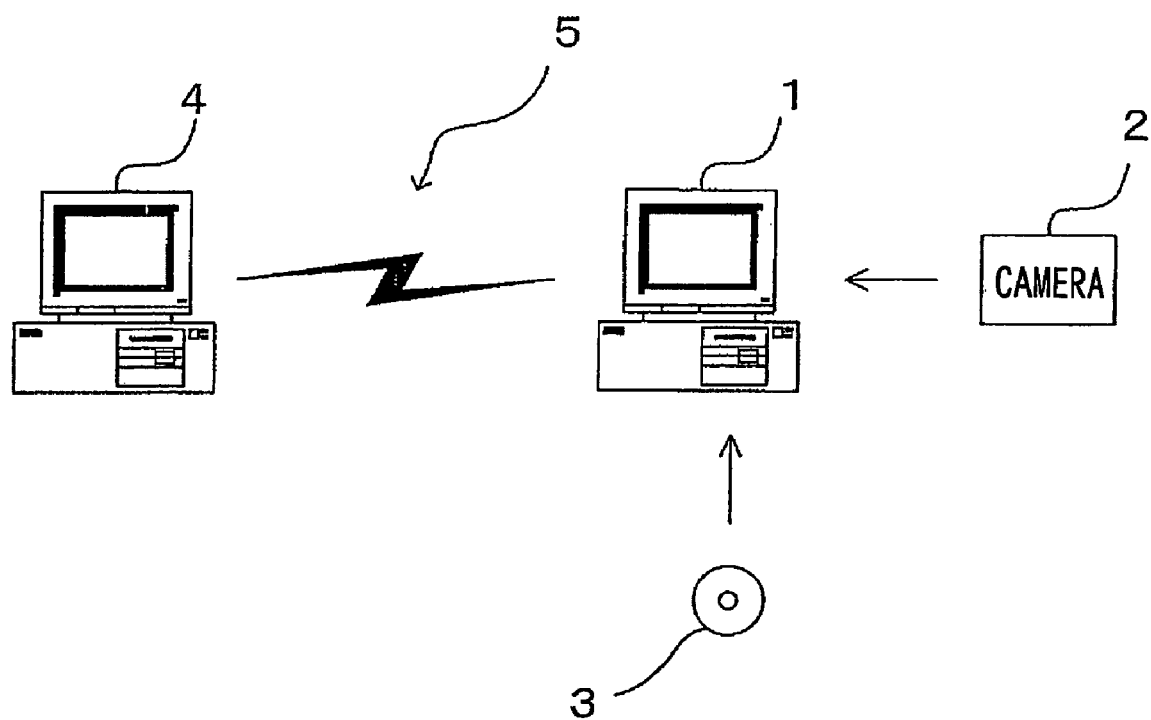

| | | | |
|---|---|---|---|
| 5,974,186 A * | 10/1999 | Smith et al. | 382/240 |
| 6,055,340 A | 4/2000 | Nagao | |
| 6,148,115 A * | 11/2000 | Mackinnon et al. | 382/266 |
| 6,526,181 B1 | 2/2003 | Smith et al. | |
| 6,535,632 B1 * | 3/2003 | Park et al. | 382/164 |
| 6,628,842 B1 * | 9/2003 | Nagao | 382/266 |
| 6,636,645 B1 * | 10/2003 | Yu et al. | 382/268 |
| 6,667,815 B1 | 12/2003 | Nagao | |
| 6,674,486 B2 | 1/2004 | Ueyama | |
| 6,728,381 B1 | 4/2004 | Hosoya | |
| 6,754,398 B1 | 6/2004 | Yamada | |
| 6,771,793 B1 * | 8/2004 | Yamada | 382/264 |
| 6,801,669 B2 | 10/2004 | Chujoh et al. | |
| 6,990,246 B1 * | 1/2006 | Ferguson | 382/240 |
| 6,990,252 B2 * | 1/2006 | Shekter | 382/276 |
| 7,257,271 B2 * | 8/2007 | Adams et al. | 382/275 |
| 7,260,266 B2 * | 8/2007 | Nakajima et al. | 382/240 |
| 7,512,264 B2 * | 3/2009 | Pollard et al. | 382/162 |
| 2002/0034337 A1 * | 3/2002 | Shekter | 382/275 |
| 2002/0076118 A1 * | 6/2002 | Kaji | 382/263 |
| 2002/0118887 A1 * | 8/2002 | Gindele | 382/260 |
| 2003/0086623 A1 * | 5/2003 | Berkner et al. | 382/260 |
| 2003/0161548 A1 * | 8/2003 | Vuylsteke | 382/274 |
| 2003/0174223 A1 * | 9/2003 | Hayashi | 348/241 |
| 2003/0215153 A1 * | 11/2003 | Gindele et al. | 382/254 |
| 2004/0008904 A1 * | 1/2004 | Lin et al. | 382/275 |
| 2004/0234166 A1 | 11/2004 | Nakajima et al. | |
| 2004/0258325 A1 | 12/2004 | Sasada | |
| 2005/0135700 A1 * | 6/2005 | Anderson | 382/261 |
| 2006/0153422 A1 * | 7/2006 | Tapson et al. | 382/100 |
| 2006/0182364 A1 * | 8/2006 | John | 382/260 |
| 2008/0199100 A1 * | 8/2008 | Ishiga | 382/263 |
| 2008/0317371 A1 * | 12/2008 | Zhang et al. | 382/261 |
| 2009/0046943 A1 * | 2/2009 | Ishiga | 382/266 |
| 2009/0290808 A1 * | 11/2009 | Ishiga | 382/261 |

FOREIGN PATENT DOCUMENTS

| | | |
|---|---|---|
| JP | A 2001-167264 | 6/2001 |
| JP | A 2002-074356 | 3/2002 |
| JP | A 2004-240955 | 8/2004 |
| JP | A 2004-242285 | 8/2004 |

OTHER PUBLICATIONS

Chang et al., "Adaptive Wavelet Thresholding for Image Denoising and Compression," IEEE Transactions on Image Processing, Sep. 2000, vol. 9—No. 9, IEEE Service Center, Piscataway, U.S.A.

Motwani et al., "Survey of Image Denoising Techniques," Proceedings of the Global Signal Processing Expo and Conference, Sep. 27, 2004, pp. 1-8.

Feb. 15, 2010 Supplementary Partial Search Report issued in European Patent Application No. 06 73 0784.

Jong-Sen Lee, "Digital Image Smoothing and the Sigma Filter," 1983, Computer Vision, Graphics, and Image Processing, vol. 24, pp. 255-269.

\* cited by examiner

FIG.5

(a) $\nabla^2 =$

| -1 | -1 | -1 |
|---|---|---|
| -1 | 8 | -1 |
| -1 | -1 | -1 |

/16

(b) ORIGINAL SIGNAL =

| 0 | 0 | 0 |
|---|---|---|
| 0 | 16 | 0 |
| 0 | 0 | 0 |

/16

(c) $<>_{3 \times 3} =$

| 1 | 1 | 1 |
|---|---|---|
| 1 | 8 | 1 |
| 1 | 1 | 1 |

/16

FIG.8 LUMINANCE PLANE PROCESSING

FIG.10 CHROMINANCE PLANE PROCESSING

FIG.12 CHROMINANCE PLANE PROCESSING

FIG.14 LUMINANCE PLANE PROCESSING

IMAGE PROCESSING METHOD FOR REMOVING NOISE FROM AN IMAGE

TECHNICAL FIELD

The present invention relates to an image processing method that may be adopted to remove noise contained in an image.

BACKGROUND ART

There is a method known in the related art whereby noise is simply removed from an image in the real space, expressed in a single channel band (see patent reference 1). In this method, a high-frequency component signal containing an edge component is extracted through high-pass filter processing executed by using a fixed filter coefficient and the noise component contained in the high-frequency component signal is estimated through nonlinear conversion processing. Adaptive filtering such as a filter processing, which assures higher resolution and has a heavy processing load by using a filter coefficient that changes in correspondence to the image structure, is not executed in this method. However, there is an issue yet to be addressed in the method in that the high-pass-filter size cannot easily be increased without compromising the simplicity of the processing, making it difficult to effectively remove noise occurring over a long cycle.

There is also a method known in the related art whereby noise is removed by using multiple channel band image expressed based upon multi-resolution representation. This method may be realized most simply in conjunction with the coring technology whereby the slight fluctuation component in a high-pass sub-band images generated through multi-resolution transformation is set to zero. Patent reference 2 discloses a nonlinear coring technology through which the coring operation is executed so as to achieve a gradual characteristics curve instead of through threshold value processing.

While patent reference 1, too, describes an example in which the real space processing is adopted in conjunction with multi-resolution representation, the technology disclosed in patent reference 1 is basically equivalent to a high-pass sub-band nonlinear coring processing technology. Namely, it teaches a technology whereby the operation for generating a high-pass component in the real space processing is replaced by high-pass sub-band image generation achieved through the multi-resolution transformation, which ultimately is simply an example of a variation of processing for coring the high-pass sub-band images.

In the high-pass sub-band coring processing executed on the multi-resolution images, noise is removed simply based upon the value of the sub-band coefficient itself. Since this noise removal processing is not by any means high-definition noise removal processing, the resulting image quality is hardly ideal. This issue is addressed in patent reference 3 and patent reference 4, each disclosing a technology whereby noise removal processing is executed by correcting the sub-band coefficient based upon the high-pass sub-band coefficient and nearby sub-band coefficients instead of using the high-pass sub-band coefficient alone so as to improve the image quality.

Patent reference 1: Japanese Laid Open Patent Publication No. 2002-74356

Patent reference 2: U.S. Pat. No. 5,467,404

Patent reference 3: U.S. Pat. No. 5,461,655

Patent reference 4: U.S. Pat. No. 5,526,446

DISCLOSURE OF THE INVENTION

Problems to be Solved by the Invention

However, the technology disclosed in either patent reference 3 or patent reference 4 requires statistical analysis and necessitates complex processing such as neural-network processing, failing to strike the optimal balance between simplicity and high image quality.

Means for Solving the Problems

According to the 1st aspect of the present invention, an image processing method for removing noise contained in an image, comprises: inputting an original image constituted with a plurality of pixels; generating a plurality of band-limited images, resolution levels of which are lowered in sequence, by executing a specific type of band pass filter processing on the original image; extracting a high-frequency component from each of the band-limited images by executing high-pass filter processing on the band-limited images; extracting a noise component contained in each of the band-limited images by separating the noise component through nonlinear conversion processing executed on the extracted high-frequency component; and removing the noise in the original image based upon the extracted noise component in each band-limited image.

According to the 2nd aspect of the present invention, in the image processing method according to the 1st aspect, it is preferred that the plurality of band-limited images are a set of high-frequency band images, the resolution levels of which are lowered in sequence, obtained through multi-resolution transformation executed on the original image.

According to the 3rd aspect of the present invention, in the image processing method according to the 1st aspect, it is preferred that the plurality of band-limited images are a set of low-frequency band images, the resolution levels of which are lowered in sequence, obtained through multi-resolution transformation executed on the original image.

According to the 4th aspect of the present invention, in the image processing method according to the 1st aspect, it is preferred that the plurality of band-limited images include both a set of low-frequency band images, the resolution levels of which are lowered in sequence, and a set of high-frequency band images, the resolution levels of which are lowered in sequence, obtained through multi-resolution transformation executed on the original image.

According to the 5th aspect of the present invention, in the image processing method according to the 2nd aspect, it is preferred that the plurality of band-limited images are a set of high-pass component sub-band images resulting from wavelet transformation.

According to the 6th aspect of the present invention, in the image processing method according to the 3rd aspect, it is preferred that the plurality of band-limited images are a set of low pass component sub-band images resulting from wavelet transformation.

According to the 7th aspect of the present invention, in the image processing method according to any one of the 1st through the 6th aspects, it is preferred that the nonlinear conversion processing is attenuation processing whereby a non-noise component contained in the high-frequency component is attenuated by multiplying the high-frequency component by a weighted Gaussian coefficient having an argument of a value resulting from a comparison of the high-frequency component with a predetermined threshold value.

According to the 8th aspect of the present invention, in the image processing method according to any one of the 1st through 7th aspects, it is preferred that the high-pass filter processing is executed on the plurality of band-limited images by using filters of uniform size.

According to the 9th aspect of the present invention, an image processing method for removing noise contained in an image, comprises: obtaining the image; extracting a noise component by executing a specific type of processing on the obtained image; subtracting the extracted noise component from the image; extracting a correction component by re-executing the specific type of processing on the image from which the noise component has been subtracted; and adding the extracted correction component to the image from which the noise component has been subtracted.

According to the 10th aspect of the present invention, in the image processing method according to the 9th aspect, it is preferred that: a high-frequency component is extracted from the obtained image; the noise component is extracted from the extracted high-frequency component through nonlinear conversion; a high-frequency component is extracted again from the image from which the noise component has been subtracted; the correction component is extracted from the re-extracted high-frequency component through the nonlinear conversion; and the extracted correction component is added to the image from which the noise component has been subtracted.

According to the 11th aspect of the present invention, in the image processing method according to the 9th or the 10th aspect, it is preferred that: the image is constituted with a luminance component and a chrominance component; and processing for adding the correction component to the image from which the noise component has been subtracted is executed for an image corresponding to the luminance component alone.

According to the 12th aspect of the present invention, an image processing method for removing noise contained in an image, comprises: inputting an original image expressed by using a luminance component and a chrominance component; generating a plurality of band-limited images, resolution levels of which are lowered in sequence, by filtering the original image; and executing noise removal processing on the plurality of band-limited images by referencing nearby pixels, and a procedure for referencing nearby pixels in the noise removal processing executed on the band-limited images corresponding to the luminance component and a procedure for referencing nearby pixels in the noise removal processing executed on the band-limited images corresponding to the chrominance component are different from each other.

According to the 13th aspect of the present invention, in the image processing method according to the 12th aspect, it is preferred that: the noise removal processing on the band-limited images corresponding to the chrominance component is executed by extracting a high-frequency component from a band-limited image corresponding to the chrominance component, extracting a noise component through nonlinear conversion processing executed on the extracted high-frequency component and then subtracting the extracted noise component from the band-limited image corresponding to the chrominance component; and the noise removal processing on the band-limited images corresponding to the luminance component is executed by extracting a high-frequency component from a band-limited image corresponding to the luminance component, extracting a noise component through nonlinear conversion processing executed on the extracted high-frequency component, executing subtraction processing to subtract the extracted noise component from the band-limited image corresponding to the luminance component, re-extracting a high-frequency component from the band-limited image corresponding to the luminance component having undergone the subtraction processing, extracting a correction component through nonlinear conversion processing executed on the re-extracted high-frequency component and adding the extracted correction component to the band-limited image corresponding to the luminance component having undergone the subtraction processing.

According to the 14th aspect of the present invention, an image processing method for removing noise contained in an image, comprises: inputting an original image constituted with a plurality of pixels; generating a plurality of band-limited images, resolution levels of which are lowered in sequence, by executing a specific type of band pass filter processing on the original image; extracting a high-frequency component from each of the band-limited images by executing high-pass filter processing on the band-limited images; extracting a noise component contained in each of the band-limited images by making a decision as to whether or not the extracted high-frequency component is greater than a predetermined threshold value; and removing the noise in the original image based upon the extracted noise component from each band-limited image.

According to the 15th aspect of the present invention, in the image processing method according to the 7th or the 14th aspect, it is preferred that a standard deviation value determined in a uniform image area of the original image is used as the predetermined threshold value.

According to the 16th aspect of the present invention, an image processing method for removing noise contained in an image, comprises: obtaining the image; converting the obtained image to an image in a uniform noise space; extracting a noise component from the converted image in the uniform noise space; and subtracting the extracted noise component from the converted image in the uniform noise space.

According to the 17th aspect of the present invention, in the image processing method according to the 16th aspect, it is preferred that the noise component is extracted by first extracting a high-frequency component from the converted image in the uniform noise space and then executing nonlinear conversion on the extracted high-frequency component.

According to the 18th aspect of the present invention, in the image processing method according to the 17th aspect, it is preferred that: the high-frequency component in each of a plurality of varying frequency bands is individually extracted from the converted image in the uniform noise space; the noise component in each of the plurality of frequency bands is individually extracted through nonlinear conversion from the extracted high-frequency component in a corresponding frequency band among the plurality of frequency bands; and the extracted noise component in each of the plurality of frequency bands is subtracted from the converted image in the uniform noise space.

According to the 19th aspect of the present invention, a computer-readable computer program product comprises an image processing program that enables a computer or an image processing apparatus to execute an image processing method according to any one of the 1st through the 18th aspects.

According to the 20th aspect of the present invention, an image processing apparatus comprises a control device that executes an image processing method according to any one of the 1st through the 18th aspects.

ADVANTAGEOUS EFFECT OF THE INVENTION

According to the present invention adopting the structure described above, high-speed processing and hardware configuration are facilitated and, at the same time, a natural-looking noise removal effect is achieved.

BRIEF DESCRIPTION OF THE DRAWINGS (FIG. 1) The image processing apparatus achieved in an embodiment of the present invention
(FIG. 2) Sub-band partition achieved through five-stage wavelet transformation
(FIG. 3) The relationship among data LL0~LL5 generated at the various stages of the wavelet transformation
(FIG. 4) A flowchart of the color space conversion processing executed by the personal computer 1
(FIG. 5) A Laplacian filter
(FIG. 6) A graph of the curve representing the function used in the nonlinear conversion
(FIG. 7) A flowchart of the noise removal processing executed by the personal computer 1 in a first embodiment
(FIG. 8) A flowchart of the luminance plane processing executed by the personal computer 1
(FIG. 9) A flowchart of the color space reverse conversion processing executed by the personal computer 1
(FIG. 10) A flowchart of the noise removal processing executed by the personal computer 1 in a second embodiment
(FIG. 11) An illustration of the noise removal achieved in the second embodiment
(FIG. 12) A flowchart of the chrominance plane extension processing executed by the personal computer 1 in a fourth embodiment
(FIG. 13) The noise removal achieved through the extension processing
(FIG. 14) A flowchart of the luminance plane extension processing executed by the personal computer 1 in a fourth embodiment
(FIG. 15) A flowchart of the noise removal processing executed by the personal computer 1 in a third embodiment

BEST MODE FOR CARRYING OUT THE INVENTION

First Embodiment

FIG. 1 shows the image processing apparatus achieved in an embodiment of the present invention. The image processing apparatus is constituted with a personal computer 1. The personal computer 1, which is connected with a digital camera 2, a recording medium 3 such as a CD-ROM, another computer 4 and the like, is able to receive various types of image data. The personal computer 1 executes the image processing to be explained below on the image data provided thereto. The personal computer 1 is connected to the computer 4 via an electronic communication network 5, which may be the Internet.

The program that enables the computer 1 to execute the image processing is provided in a recording medium such as a CD-ROM or by another computer via the Internet or another electronic communication network connected to the personal computer in a manner similar to that shown in FIG. 1, and the program thus provided is installed within the personal computer 1. The personal computer 1 comprises a CPU (not shown) and its peripheral circuits (not shown). The installed program is executed by the CPU.

The program to be provided via the Internet or another electronic communication network is converted to and transmitted as a signal on a carrier wave which is carried through the electronic communication network, i.e., a transmission medium. Namely, the program can be distributed as a computer-readable computer program product adopting any of various modes including a recording medium and a carrier wave.

The personal computer 1 executes a specific type of color space conversion on linear RGB image data input thereto and then executes sequential wavelet transformation on the image data having undergone the color space conversion as noise is removed in various wavelet spaces. Subsequently, it executes inverse wavelet transformation so as to ultimately obtain image data free of noise, from which noise in a plurality of frequency bands has been removed. The noise-free image data then undergo color space reverse conversion and, as a result, noise-free linear RGB image data are obtained. Noise removal achieving edge-preserving smoothing is executed through the procedure described above.

(Wavelet Transformation)

The wavelet transformation (multi-resolution transformation) is first explained. In the wavelet transformation, through which image data are transformed (or converted) to frequency component data, the frequency component in the image is divided into a high-pass component and a low-pass component. In the embodiment, a 5/3 filter is utilized to execute five-stage wavelet transformation. The 5/3 filter generates the low-pass component with a filter having five taps (one-dimension/5 pixels) and generates the high-pass component with a filter having three taps (one-dimension/3 pixels).

The high-pass component and the low-pass component are generated as expressed below. The expressions below each represent the corresponding band pass filter. In the expressions, n indicates the pixel position and x[ ] indicates the pixel value assumed at the target image undergoing the wavelet transformation. For instance, n assumes a value in the range of 0~49 if 100 pixels are set along the horizontal direction. By extracting the high-pass component and the low-pass component as expressed below, the high-pass component data and the low-pass component data at 50 pixels, i.e., half the pixels, are extracted. These data are processed along the horizontal direction and the vertical direction.

High-Pass Component:

$$d[n]=x[2n+1]-(x[2n+2]+x[2n])/2 \quad (1)$$

Low-Pass Component:

$$s[n]=x[2n]+(d[n]+d[n-1])/4 \quad (2)$$

By using the expressions presented above, the wavelet transformation is executed in sequence over five stages, as indicated below. Namely, wavelet transformation for converting images to a group of sub-band images in which multiple channel band images are expressed based upon multi-resolution representation is achieved by repeatedly executing band pass filter processing. In the embodiment, noise signals are extracted by using LL-component data generated at the individual stages, as explained later. It is to be noted that LL may be referred to as a low-frequency sub-band and that LH, HL and HH may each be referred to as a high-frequency sub-band. In addition, a low-frequency sub-band may also be referred to as a low-frequency band image and a high-frequency sub-band may also be referred to as a high-frequency band image. The individual sub-bands may also be referred to as frequency band-limited images. A low-frequency sub-band is a band-limited image obtained by limiting the frequency band of the original image onto the low-frequency side, whereas a high-frequency sub-band is a band-limited image obtained by limiting the frequency band of the original image onto the high-frequency side.

First-Stage Wavelet Transformation:
LL0 (real space)->LL1, LH1, HL1, HH1
Second-Stage Wavelet Transformation:
LL1->LL2, LH2, HL2, HH2
Third-Stage Wavelet Transformation:
LL2->LL3, LH3, HL3, HH3
Fourth Stage Wavelet Transformation:
LL3->LL4, LH4, HL4, HH4
Fifth-Stage Wavelet Transformation:
LL4->LL5, LH5, HL5, HH5

Figure 2:
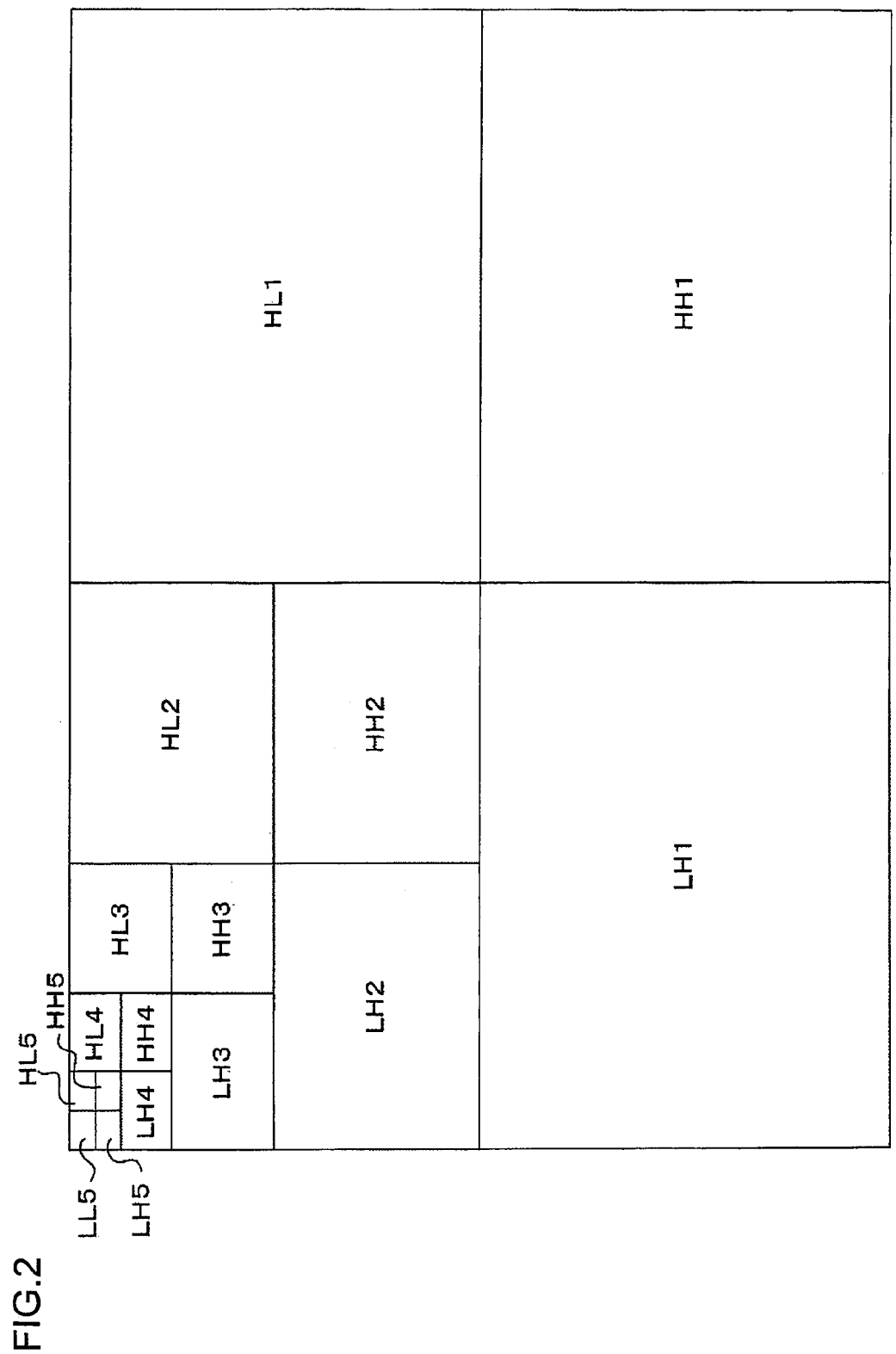

FIG. 2 shows the sub-band partition achieved through the five-stage wavelet transformation. For instance, through the first-stage wavelet transformation, high-pass component data and low-pass component data are extracted from the image data in all the rows extending along the horizontal direction in the real space. As a result, high-pass component data and low-pass component data corresponding to half the entire number of pixels are extracted along the horizontal direction. The extracted high-pass component data and low-pass component data may be respectively stored into, for instance, memory areas on the right side and on the left side of the memory area where the image data in the real space have been present.

Next, high-pass component data and low-pass component data are extracted as expressed earlier, individually from the high-pass component data having been stored on the right side in the memory area and from the low-pass component data having been stored on the left side in the memory area, along all the columns extending in the vertical direction. As a result, high-pass component data and low-pass component data are extracted both from the high-pass component data stored on the right side in the memory area and from the low-pass component data stored on the left side in the memory area. The high-pass component data and the low-pass component data thus extracted are stored on the bottom side and the top side respectively in the memory area where the corresponding source data have been present.

HH indicates data extracted as high-pass component data along the vertical direction from data having been extracted as high-pass component data along the horizontal direction, HL indicates data extracted as low-pass component data along the vertical direction from the data having been extracted as high-pass component data along the horizontal direction, LH indicates data extracted as high-pass component data along the vertical direction from data having been extracted as low-pass component data along the horizontal direction and LL indicates data extracted as low-pass component data along the vertical direction from data having been extracted as low-pass component data along the horizontal direction.

Next, through the second-stage wavelet transformation, high-pass component data and low-pass component data are extracted in a similar manner from the data LL extracted through the first-stage wavelet transformation as low-pass component data along the vertical direction from the data having been extracted as the low-pass component data along the horizontal direction. The partition shown in FIG. 2 is achieved by repeatedly executing the processing described above over five stages.

Figure 3:
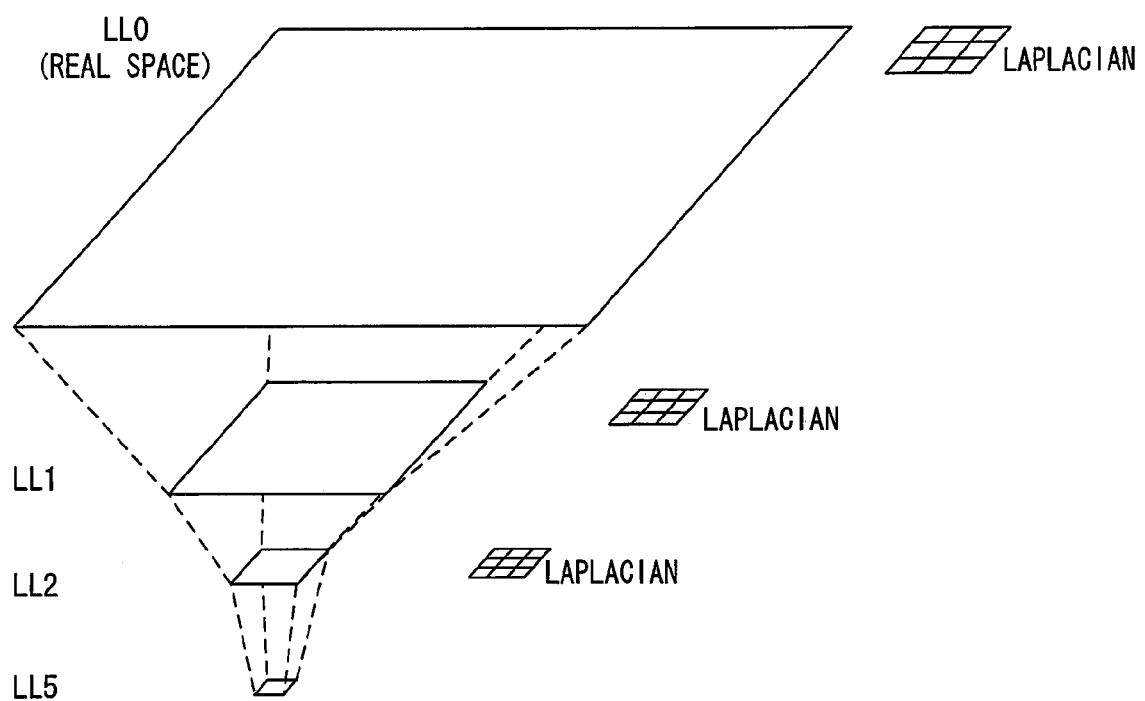

FIG. 3 shows the relationship among the data LL0~the data LL5 generated at the various stages of the wavelet transformation. Next, the specific processing executed in the first embodiment is explained.

(1) Color Space Conversion

Figure 4:
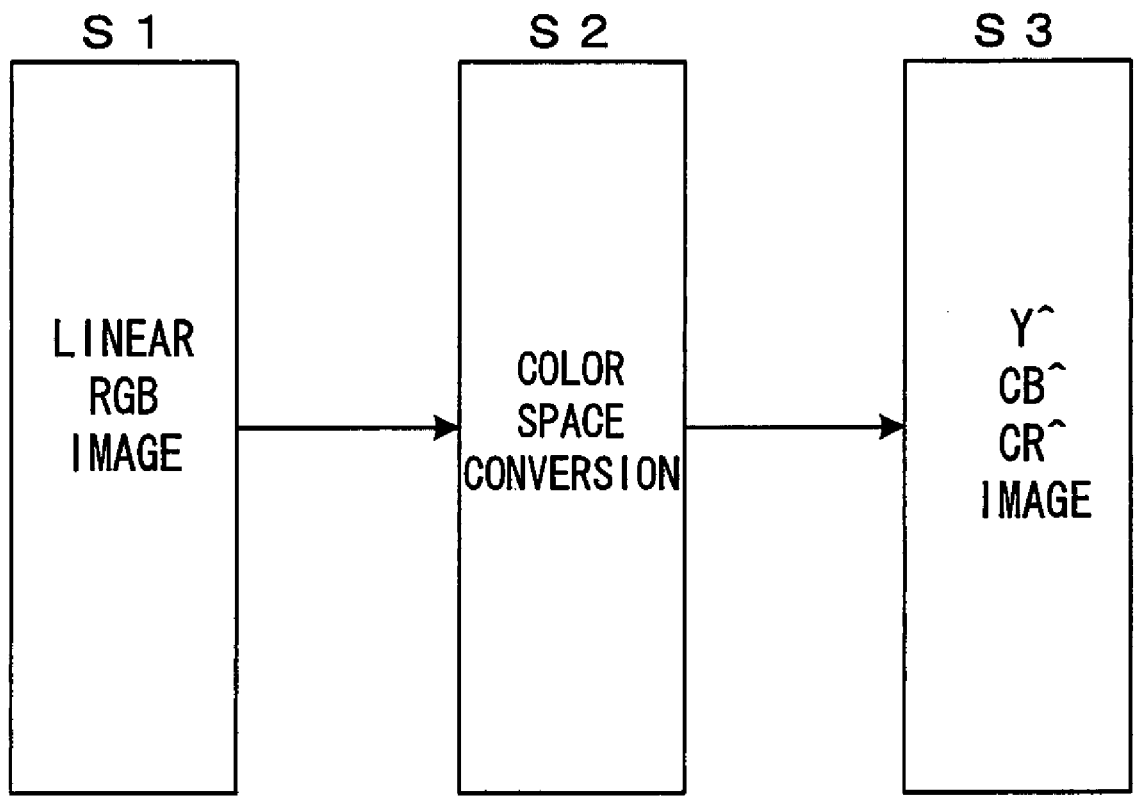

FIG. 4 presents a flowchart of the color space conversion processing executed by the personal computer 1. In step S1, linear RGB image data are input. In step S2, the linear RGB image data are converted to a uniform noise space Y^Cb^Cr^. In step S3, Y^Cb^Cr^ image data resulting from the conversion to the uniform noise space are obtained.

The linear RGB image data input in step S1 are RGB colorimetric system data that express a linear gradation. The RGB calorimetric system data, which have been obtained by capturing an image with, for instance, an image sensor such as a CCD equipped with color filters disposed in a Bayer array, will have undergone various types of interpolation processing so that each pixel holds color information corresponding to the R component, the G component and the B component. Linear gradation data are gradation data achieving linearity relative to the light intensity, which assume color information values in positive proportion to the amount of received light. Namely, it is assumed that the level of blackness attributable to an offset that may happen even in a totally dark state will have been corrected. It is assumed that data having undergone gamma correction will have been converted back into the linear gradation data format. Such image data may be obtained by capturing an image with the digital camera 2 or another imaging device.

In step S2, the linear RGB image data having been input are converted to a uniform noise space where noise uniformity is achieved relative to the gradation. As a result, the data assumes a state that facilitates noise removal. Uniformity may be achieved for noise that includes shot noise and dark noise attributable to the sensor and circuit system, by executing following expressions in which the RGB linear gradation image data to which an offset signal is added are converted to achieve square root gradation characteristics. Namely, a non-linear gradation conversion assuming square root characteristics is executed. ε in the expressions represents the offset signal.

[Expression 1]

$$R' = R'_{max} \frac{\sqrt{\frac{R}{R_{max}} + \varepsilon} - \sqrt{\varepsilon}}{\sqrt{1+\varepsilon} - \sqrt{\varepsilon}} \quad (3)$$

$$G' = G'_{max} \frac{\sqrt{\frac{G}{G_{max}} + \varepsilon} - \sqrt{\varepsilon}}{\sqrt{1+\varepsilon} - \sqrt{\varepsilon}} \quad (4)$$

$$B' = B'_{max} \frac{\sqrt{\frac{B}{B_{max}} + \varepsilon} - \sqrt{\varepsilon}}{\sqrt{1+\varepsilon} - \sqrt{\varepsilon}} \quad (5)$$

While the value assumed for ε varies depending upon the sensor in use, a value close to zero is taken when the ISO value is approximately 100 and a positive value approximately equal to 0.05 is taken when the ISO value is approximately 6400. It is to be noted that Japanese Patent Application No. 2004-200890 (filed by the inventor of the present invention) discloses that when noise contains both shot noise and dark noise, a uniform noise space can be generated by applying an offset signal in correspondence to the dark noise level prior to the square root gradation conversion.

Then, luminance (brightness) and chrominance (color-difference) signals Y^, Cb^ and Cr^ are generated as expressed below by using the data R', G' and B'. It is to be noted that the luminance and chrominance signals Y^, Cb^ and Cr^ are generated as expressed below by using the data R', G' and B' resulting from the data conversion into the uniform noise space. The symbol circumflex (or hat) "^" is attached to each signal to indicate that the data are present in a space achieving uniform noise.

$$Y\hat{} = (R'+2G'+B')/4 \quad (6)$$

$$Cr\hat{} = R'-G' \quad (7)$$

$$Cb\hat{} = B'-G' \quad (8)$$

Since uniformity has been achieved with regard to the noise in the initial data R', G' and B' relative to the gradation, the luminance and chrominance signals Y^, Cb^ and Cr^ too, assume uniform noise characteristics relative to the gradation. It is to be noted that luminance and chrominance signals generated by using R, G and B yet to be converted to data in the uniform noise space are simply indicated as Y, Cb and Cr.

It is to be noted that the present invention is not limited to the example described above, in which the data are converted into the uniform noise space. It is even more desirable to convert the data to those in a uniform color and uniform noise space, which is an even more desirable image processing space. A method that may be adopted when converting data into those in a uniform color and uniform noise space is disclosed in Japanese Patent Application No. 2004-365881 (filed by the inventor of the present invention).

Subsequently, the wavelet transformation and the noise removal are independently executed on the individual planes, i.e., the Y^ plane, the Cb^ plane and the Cr^ plane in the uniform noise space. The sequential wavelet transformation is executed for each plane, noise signals are extracted by using the LL component data generated at the various stages and noise is thus eliminated.

(2) Chrominance Plane Noise Removal Processing

Next, a method that may be adopted to remove color noise (color mottling noise) containing all types of frequency component that may manifest in random noise without destroying the color structure through adaptive noise removal executed on the chrominance signals expressed in the uniform noise space, is explained.

The basic processing executed in a given wavelet sub-band space is first explained before the explanation proceeds to describe noise removal achieved by integrating the noise removal executed in the individual wavelet sub-band spaces. While the processing is executed separately on the individual planes, i.e., the Cb^ plane and the Cr^ plane, the contents of the processing are identical. In addition, certain details of the processing are also identical to those of the luminance plane processing to be detailed later. Accordingly, the explanation is provided in general terms by indicating the intensity level on each signal plane as I(x,y). It is to be noted that in the description of the embodiment, the terms "signal", "data", "component" and the like are basically regarded to be synonymous. In addition, the term "plane" is used to refer to a group of such signals, data or components. For instance, a chrominance plane is a group of chrominance data, chrominance signals or chrominance components, whereas a luminance plane is a group of luminance data, luminance signals or luminance components. In addition, the Cr^ plane and the Cb^ plane are respectively groups of chrominance data Cr^ and Cb^, chrominance signals Cr^ and Cb^ or chrominance components Cr^ and Cb^, whereas the Y^ plane is a group of the luminance data Y^, the luminance signal Y^ or the luminance component Y^.

(Basic Processing)

1. Edge and Noise Signal Extraction Through Laplacian Filter

With $I_0$ indicating the state of the initial signal plane or the LL component plane generated through wavelet transformation, $\nabla^2$ indicating a Laplacian filter, and $<>_{n \times n}$ representing smoothing processing executed over a range n×n, a high-frequency component ΔI extracted through the Laplacian filter can be expressed as below.

$$\Delta I(x,y) = \nabla^2 I_0(x,y) = I_0(x,y) - <I_0(x,y)>_{n \times n} \quad (9)$$

The simplest Laplacian filter that may be routinely used when n=3 is shown in FIG. 5(a) and the actual arithmetic operation is executed by utilizing this filter. To describe this Laplacian filter (high-pass filter, high-frequency pass filter) in reference to a low pass filter (low-frequency pass filter) with which the Laplacian filter has a complementary relationship, the Laplacian filter processing is equivalent to processing through which a plane having undergone the 3×3 smoothing filter processing shown in FIG. 5(c) is subtracted from the original signal plane shown in FIG. 5(b). The high-frequency component signal ΔI that extracted contains both an edge component signal and a noise component signal.

2. Noise Signal Extraction Through Nonlinear Conversion

A noise signal $\Delta I_{noise}$ is extracted by executing the following nonlinear conversion on the high-frequency component signal ΔI by using information indicating the Gaussian distribution characteristics inherent to the random noise component signal.

[Expression 2]

$$\Delta I_{noise}(x, y) = \Delta I(x, y) \cdot \exp\left(-\frac{|\Delta I(x, y)|^2}{\sigma_{th}^2}\right) \quad (10)$$

The constant $\sigma_{th}$ in the expression provided above should be a constant multiple of the standard deviation in a uniform image area measured in the uniform noise space. Namely, the component that fluctuates over the range $\sigma_{th}$ in the vicinity of the point at which the high-frequency component ΔI takes the value of 0 represents noise and, accordingly, a signal indicating a large value beyond the range $\sigma_{th}$, which does not exactly match the noise characteristics profile and thus cannot be determined with certainty to be noise, is assumed to be a signal taken over an edge area and is separated from the noise component.

Figure 6:
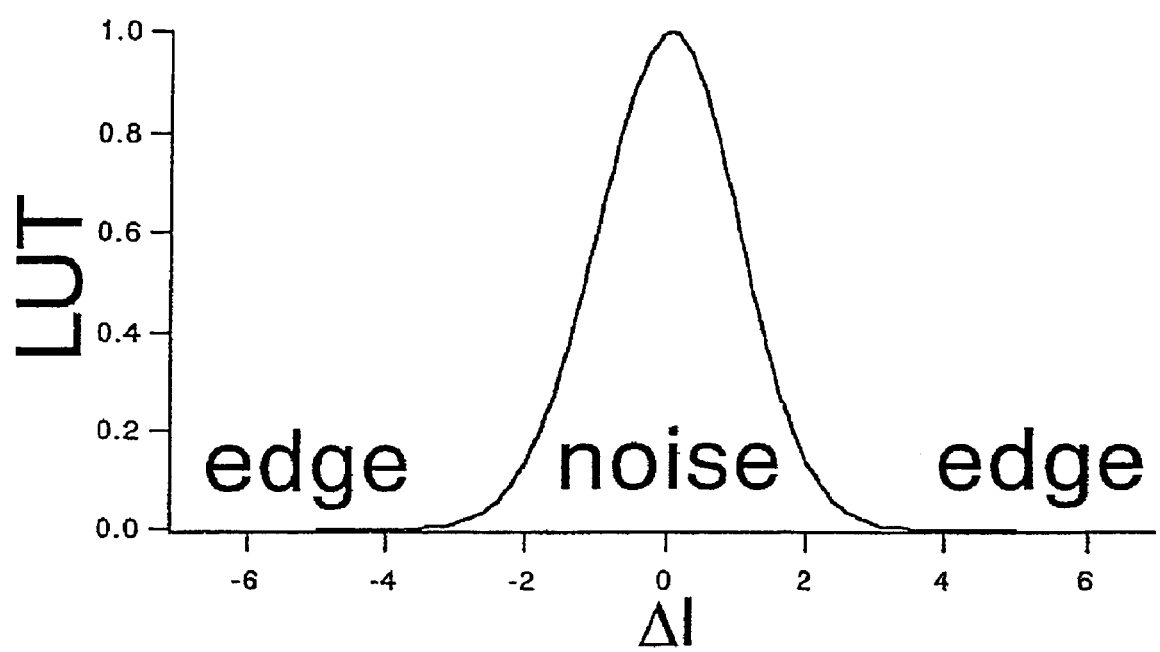

FIG. 6 presents a graph of the processing and more specifically, it presents a graph indicating the nonlinear conversion characteristics expressed in (10). By allowing the value obtained through the Gaussian exponential function operation expressed in (10) to be looked up in an LUT in reference to ΔI used as an argument, the arithmetic operation can be executed quickly. The nonlinear conversion expressed in (10) is attenuation processing through which the high-frequency component ΔI, excluding the noise component contained therein, is attenuated by multiplying the high-frequency component ΔI by a weighted Gaussian coefficient with a value indicating comparison of the high-frequency component ΔI with a predetermined threshold value $\sigma_{th}$ designated as an argument thereof.

3. Noise Removal Achieved by Subtracting Noise Signal from Original Signal

Noise-free image data I' are obtained by subtracting the extracted noise signal $\Delta I_{noise}$ from the original signal as expressed below.

$$I'(x,y) = I_0(x,y) - \Delta I_{noise}(x,y) \quad (11)$$

Thus, the part of the high-frequency component having been extracted as noise is not attenuated and is subtracted from the original signal while still assuming a value close to the initial value, whereas the part of the high-frequency component that has not been extracted as noise, i.e., the edge component is subtracted as data assuming a substantially attenuated value. As a result, the noise is removed from the data in which the edge component remains substantially intact.

(Noise Removal Achieved by Integrating Noise Removal Executed in Various Wavelet Sub-Band Spaces)

The basic processing described above relates to the noise removal processing executed in a given wavelet sub-band space. In the embodiment, the basic processing described above is executed in each wavelet sub-band space as wavelet transformation progresses, and then inverse wavelet transformation is executed so as to obtain a noise-free image by integrating the results of the noise removal having been executed in the individual wavelet sub-band spaces. Namely, noise removal with a natural-looking result is achieved by factoring in noise signals over a plurality of frequency bands through the wavelet transformation.

With $I_0$ representing the state of the initial signal plane and $\Delta I_{noise}$ representing the noise signal extracted in each wavelet sub-band space, the noise-free image data I' can be expressed as in the model expression below. The expression below indicates that the noise components having been extracted in the various wavelet sub-band spaces are extracted from the original signal.

[Expression 3]

$$I'(x, y) = I_0(x, y) - \Delta I_{noise}^{(LL0)}(x, y) - \Delta I_{noise}^{(LL1)}(x, y; LL0') - \Delta I_{noise}^{(LL2)}(x, y; LL1') - \Delta I_{noise}^{(LL3)}(x, y; LL2') - \Delta I_{noise}^{(LL4)}(x, y; LL3') - \Delta I_{noise}^{(LL5)}(x, y; LL4')$$
$$= I_0(x, y) - \Delta I_{noise}^{(LL0)}(x, y) - \sum_{k=1}^{5} \Delta I_{noise}^{(LLk)}(x, y; LL(k-1)') \quad (12)$$

Figure 7:
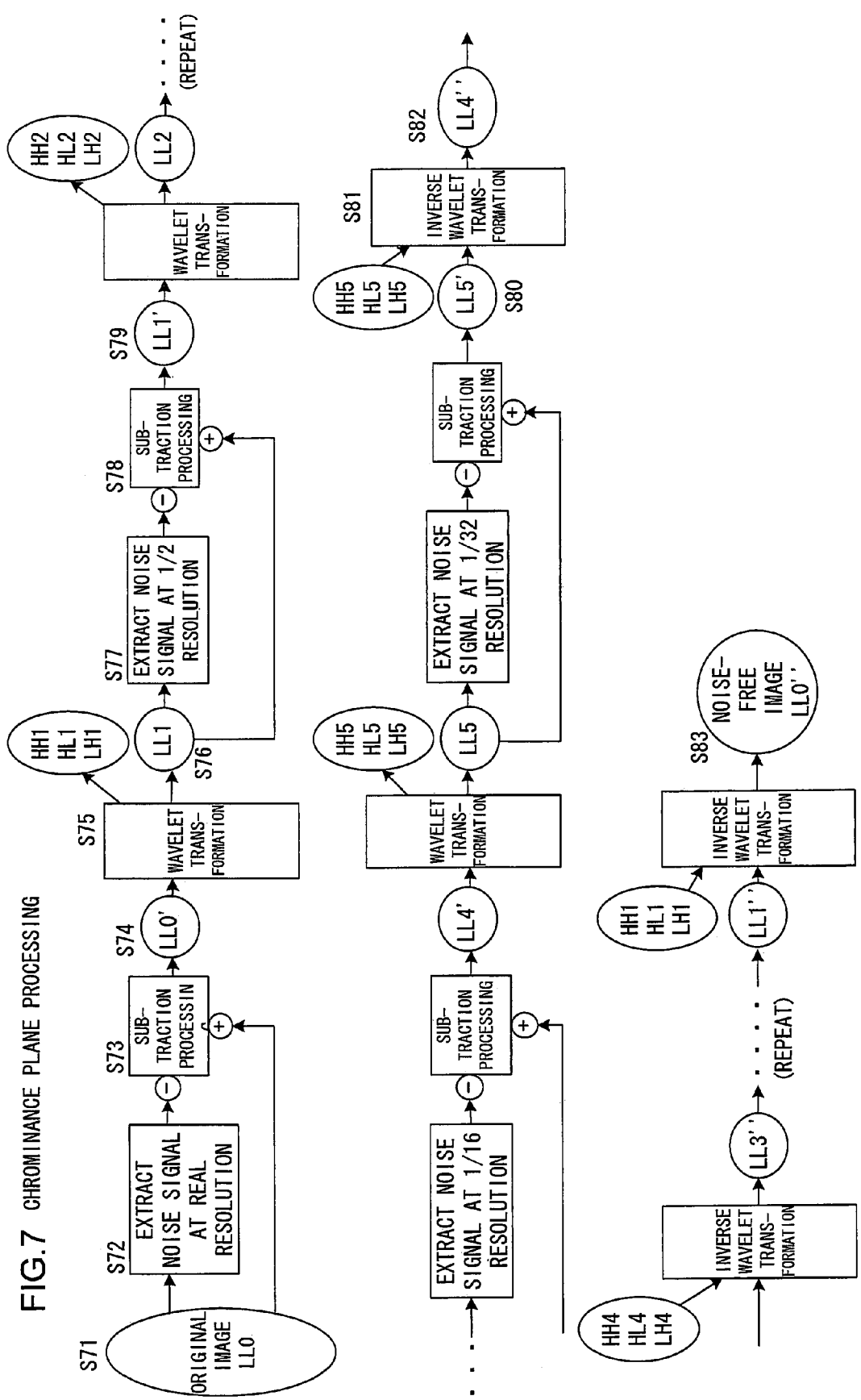

FIG. 7 presents a flowchart of the noise removal processing executed on a chrominance plane by the personal computer 1. Identical processing is executed for the chrominance plane Cr^ and the chrominance plane Cb^. The processing executed in steps S71 through S74 is noise removal processing executed in the real space. In step S71, data LL0 in the real space are obtained. In step S72, the noise signal at the actual resolution is extracted. In step S73, the noise signal is subtracted from the real space data LL0 and LL0', now free of noise, is thus obtained in step S74.

The processing executed in step S72 and step S73 corresponds to the processing; "1. Edge and noise signal extraction through Laplacian filter", "2. Noise signal extraction through nonlinear conversion" and "3. Noise removal achieved by subtracting noise signal from original signal", having been explained earlier in reference to the basic processing.

In step S75, wavelet transformation is executed on the data LL0' and, as a result, data LL1, LH1, HL1 and HH1 are obtained. The processing executed in steps S76 through S79 is noise removal processing executed on the data LL1. The processing executed in step S77 and step S78 corresponds to the processing; "1. Edge and noise signal extraction through Laplacian filter", "2. Noise signal extraction through nonlinear conversion" and "3. Noise removal achieved by subtracting noise signal from original signal", having been explained earlier in reference to the basic processing, as is the processing in steps S72 and S73. However, the noise signal at ½ resolution is extracted in step S77. In step S78, the noise signal is subtracted from the data LL1 and thus, LL1', now free of noise, is obtained in step S79.

The processing described above is repeatedly executed in sequence as the wavelet transformation progresses. Then, in step S80, data LL5' resulting from the noise removal executed on the data LL5 fifth-stage wavelet transformation are obtained.

Next, inverse wavelet transformation is executed on the data LL5' in step S81 and, as a result, data LL4" are obtained in step S82. This inverse wavelet transformation is executed in sequence until noise-free-data LL0" are ultimately obtained in step S84.

The processing executed in steps S71 through S83 as described above may be summarized as follows.
(1) Noise removal in the real space: the basic processing is executed in the real space.
(2) Wavelet transformation: LL0'->LL1, LH1, HL1, HH1
(3) Noise removal for the LL1 component: the basic processing is executed for the LL1 sub-band.
(4) Wavelet transformation: LL1'->LL2, LH2, HL2, HH2
(5) Noise removal for the LL2 component: the basic processing is executed for the LL2 sub-band.
(6) Wavelet transformation: LL2'->LL3, LH3, HL3, HH3
(7) Noise removal for the LL3 component: the basic processing is executed for the LL3 sub-band.
(8) Wavelet transformation: LL3'->LL4, LH4, HL4, HH4
(9) Noise removal for the LL4 component: the basic processing is executed for the LL4 sub-band.
(10) Wavelet transformation: LL4'->LL5, LH5, HL5, HH5
(11) Noise removal for the LL5 component: the basic processing is executed for the LL5 sub-band.
(12) Inverse wavelet transformation: LL5', LH5, HL5, HH5->LL4"
(13) Inverse wavelet transformation: LL4", LH4, HL4, HH4->LL3"
(14) Inverse wavelet transformation: LL3", LH3, HL3, HH3->LL2"
(15) Inverse wavelet transformation: LL2", LH2, HL2, HH2->LL1"
(16) Inverse wavelet transformation: LL1", LH1, HL1, HH1->LL0" (real space)

It is to be noted that the basic processing is invariably executed by using a 3×3 Laplacian filter as shown in FIG. 3.

The noise-free chrominance plane Cr^ and Cb^ are obtained as described above.

(3) Luminance Plane Noise Removal Processing

Next, the luminance plane noise removal processing is explained. The luminance signal expressed in the uniform noise space undergoes adaptive noise removal so that grainy noise containing all types of frequency components manifesting together with random noise is removed without destroying edges in the image or the textural structure of the image.

First, as in the explanation of the chrominance plane noise removal processing, the "basic processing" executed on the luminance plane data in various wavelet sub-band spaces is defined. The initial processing executed on the luminance plane, which is equivalent to the "basic processing", is identical to the "basic processing" executed on the chrominance planes. However, since the human eye is much more sensitive to the luminance plane than to the chrominance planes, the luminance plane needs to be handled with a higher level of sensitivity. In other words, if the noise signal component is simply subtracted for noise removal, as in the chrominance plane noise removal processing, the resulting luminance plane is likely to look whitish, which will lower the contrast of the entire image. This issue is attributed to the fact that the edge component is sometimes partially subtracted during the processing executed in "3. Noise removal by subtracting noise signal from original signal". In order to address this concern, additional processing is executed as part of the basic processing by executing reverse correction processing on noise-free image data.

(Basic Processing)

As in the explanation provided earlier on the chrominance plane noise removal processing, the basic processing executed on the luminance plane is explained in reference to the processing executed in one of the various luminance plane wavelet spaces. "1. Edge and noise signal extraction through Laplacian filter", "2. Noise signal extraction through nonlinear conversion" and "3. Noise removal by subtracting noise signal from original signal" are first executed as part of the basic processing has been explained in reference to the chrominance planes. The three stages of the processing may be referred to as phase 1, phase 2 and phase 3.

4. Extraction of High-Frequency Signal from Noise-Free Image Data Through Laplacian Filter With I' representing the noise-free image data, $\nabla^2$ indicating the Laplacian filter and $<\ >_{n \times n}$ representing smoothing processing executed over a range n×n, a high-frequency component $\Delta I'$ extracted from the noise-free image data I' through the Laplacian filter can be expressed as below. While the noise signal and edge signal would seemingly be extracted again through this processing, it can be safely assumed that hardly any noise remains in reality following the subtraction processing executed through phases 1~3 as described above. Thus, the noise component having already been eliminated is not extracted as data indicating any significant value. In other words a majority of the extracted high frequency component represents the edge component in "the edge and noise components" having been extracted through phase 1. It is to be noted that the definition of the Laplacian filter used in this processing is identical to that of the Laplacian filter used in "1. Edge and noise signal extraction through Laplacian filter".

$$\Delta I'(x,y) = \nabla^2 I'(x,y) = I'(x,y) - \langle I'(x,y) \rangle_{n \times n} \qquad (13)$$

5. High-Frequency Correction Signal Extraction Through Nonlinear Conversion

A high-frequency correction signal $\Delta I'_{noise}$ is extracted by executing the following nonlinear conversion on the high-frequency component signal $\Delta I'$ by using information indicating the Gaussian distribution characteristics inherent to the random noise component signal, as expressed in (10). This high-frequency correction signal $\Delta I'_{noise}$ is obtained through a process similar to "2. Noise signal extraction through nonlinear conversion" explained earlier so as to extract an edge signal indicating a level corresponding to that of the part of the edge component having been erroneously subtracted in phase 3. In other words, the high-frequency correction signal $\Delta I'_{noise}$ extracted as described above contains an edge signal indicating a level matching the level of the slight edge signal having been incorporated through phase 2.

[Expression 4]

$$\Delta I'_{noise}(x, y) = \Delta I'(x, y) \cdot \exp\left(-\frac{|\Delta I'(x, y)|^2}{\sigma_{th}^2}\right) \qquad (14)$$

6. Noise-Free Image Correction Executed by Adding High-Frequency Correction Signal to Noise-Free Image Signal The high-frequency correction signal $\Delta I'_{noise}$ having been extracted as described above is then added to the noise-free image signal I'. The image signal sustains the noise-free state during this processing, since the noise signal has been largely eliminated through the subtraction processing and thus, the initial noise signal state cannot be reinstated by adding the high-frequency correction signal. At the same time, since the signal, which matches the level of the slight edge signal having been subtracted through the processing explained earlier, is extracted and added, noise-free image data I" with the edge portions thereof accurately corrected, are obtained.

$$I''(x,y) = I'(x,y) + \Delta I'_{noise}(x,y) \qquad (15)$$

The basic processing executed on the luminance component is constituted with the procedure for obtaining an image I"(x,y) by accurately eliminating the noise component alone from the original image I(x,y). In other words, the noise component $I(x,y) - I''(x,y) = \Delta I_{noise}(x,y) - \Delta I'_{noise}(x,y)$ is extracted from the original image I(x,y) and the noise-free image I"(x,y) is obtained by subtracting the extracted noise component through the procedure.

(Noise Removal Achieved by Integrating the Basic Processing Executed in Various Wavelet Spaces)

The basic processing described above relates to the basic processing executed in a given wavelet space. In the embodiment, the basic processing described above is executed in each wavelet sub-band space as the wavelet transformation progresses. Then, in order to obtain a noise-free image, inverse wavelet transformation is executed by integrating the results of the noise removal having been executed in the individual wavelet sub-band spaces. Namely, a natural-looking noise removal effect is achieved by factoring in noise signals over a plurality of frequency bands through the wavelet transformation.

With $I_0$ representing the state of the initial signal plane and $\Delta I_{noise}$ representing the noise signal extracted in each wavelet sub-band space, the noise-free image data I' can be expressed as in the following model expression. The expression below indicates that the noise components having been extracted in the various wavelet sub-band spaces are extracted from the original signal.

[Expression 5]

$$I'(x, y) = I_0(x, y) - \{\Delta I_{noise}^{(LL0)}(x, y) - \Delta I_{noise}^{(LL0')}(x, y)\} - \sum_{k=1}^{5}\{\Delta I_{noise}^{(LLk)}(x, y; LL(k-1)'') - \Delta I_{noise}^{(LLk')}(x, y; LL(k-1)'')\} \qquad (16)$$

Consequently, noise removal, which will provide a natural-looking image by minimizing grainy noise over the full frequency range while retaining the original image structure and allowing the contrast to remain unchanged, is enabled.

Figure 8:
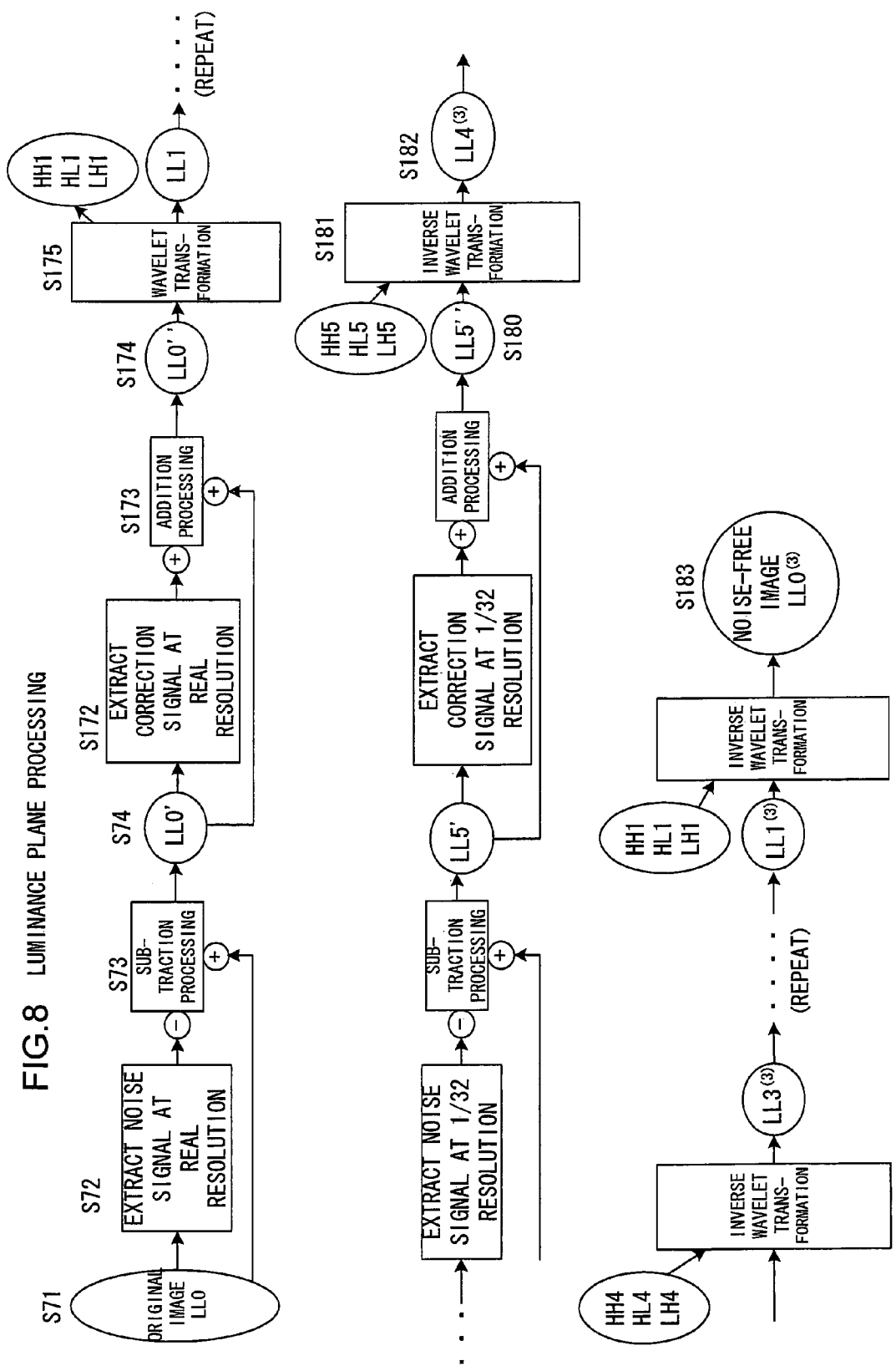

FIG. 8 presents a flowchart of the noise removal processing executed on the luminance plane Y^ by the personal computer 1. The processing executed in steps S71 through S74 is identical to the processing executed on the chrominance planes. In step S172, a correction signal is extracted from a noise-free image LL0'. In step S173, the correction signal is added to the noise-free image LL0' and in step S174, the corrected noise-free image LL0" is obtained.

The processing executed in step S172 and step S173 corresponds to the processing; "4. Extraction of high-frequency signal from noise-free image data through Laplacian filter", "5. High-frequency correction signal extraction through nonlinear conversion" and "6. Noise-free image correction executed by adding high-frequency correction signal to noise-free image signal" having been explained earlier in reference to the modified basic processing.

In step S75, wavelet transformation is executed on the data LL0" and, as a result, data LL1, LH1, HL1 and HH1 are obtained. Next, the processing in steps S72 through S74 and steps S172 through S174 is also executed on the low-frequency sub-band LL1. The processing described above is repeatedly executed in sequence as the wavelet transformation progresses. Then, in step S180, corrected noise-free data LL5" resulting from the noise removal and the correction executed on the data LL5 generated through the fifth-stage wavelet transformation, are obtained.

Next, inverse wavelet transformation is executed on the data LL5" in step S181 and, as a result, data $LL4^{(3)}$ are obtained in step S182. This inverse wavelet transformation is executed in sequence until corrected noise-free image data $LL0^{(3)}$ are ultimately obtained in step S183.

The processing executed in steps S171 through S183 as described above may be summarized as follows.

(1) Noise removal in the real space: the basic processing is executed in the real space.
(2) Wavelet transformation: LL0"->LL1, LH1, HL1, HH1
(3) Noise removal for the LL1 component: the basic processing is executed for the LL1 sub-band.
(4) Wavelet transformation: LL1"->LL2, LH2, HL2, HH2
(5) Noise removal for the LL2 component: the basic processing is executed for the LL2 sub-band.
(6) Wavelet transformation: LL2"->LL3, LH3, HL3, HH3
(7) Noise removal for the LL3 component: the basic processing is executed for the LL3 sub-band.
(8) Wavelet transformation: LL3"->LL4, LH4, HL4, HH4
(9) Noise removal for the LL4 component: the basic processing is executed for the LL4 sub-band.
(10) Wavelet transformation: LL4"->LL5, LH5, HL5, HH5
(11) Noise removal for the LL5 component: the basic processing is executed for the LL5 sub-band.
(12) Inverse wavelet transformation: LL5, LH5, HL5, HH5->$LL4^{(3)}$
(13) Inverse wavelet transformation: $LL4^{(3)}$, LH4, HL4, HH4->$LL3^{(3)}$
(14) Inverse wavelet transformation: $LL3^{(3)}$, LH3, HL3, HH3->$LL2^{(3)}$
(15) Inverse wavelet transformation: $LL2^{(3)}$, LH2, HL2, HH2->$LL1^{(3)}$
(16) Inverse wavelet transformation: $LL1^{(3)}$, LH1, HL1, HH1->$LL0^{(3)}$ (real space)

It is to be noted that the basic processing is invariably executed by using a 3×3 Laplacian filter.

The corrected noise-free image $LL0^{(3)}$, i.e., the luminance plane Y^ having undergone the noise removal and correction processing, is obtained as explained above. The noise-free image $LL0^{(3)}$ is equivalent to I'(x,y) expressed in (16).

It is to be noted that the flow of the noise removal processing executed on the luminance plane Y^ may be regarded as equivalent to the flow of the processing executed on the chrominance planes, as shown in FIG. 7. Namely, a noise-free image I'(x,y) is obtained on the chrominance planes by extracting the noise signal $\Delta I_{noise}(x,y)$ and then subtracting the extracted noise signal from the original signal, i.e., I(x, y)-$\Delta I_{noise}(x,y)$. The noise-free image I"(x,y) on the luminance plane can be regarded to be the result of processing similar to this processing, i.e., processing through which the noise signal $\Delta I_{noise}(x,y)-\Delta I'_{noise}(x,y)$ is extracted and the extracted noise signal is then subtracted from the original signal, i.e., $(I(x,y)-\{\Delta I_{noise}(x,y)-\Delta I'_{noise}(x,y)\}$.

As explained above, the nonlinear correction processing is executed by using the results of the Laplacian filter processing executed over the 3×3 filtering range and then further nonlinear correction processing is executed by using the results of Laplacian filter processing executed over the same 3×3 pixel filtering range in the basic processing of the luminance plane. In other words, the basic processing by filtering the data over the 3×3 filtering range twice. This is ultimately equivalent to executing highly accurate noise extraction processing over a 5×5 filtering range. Namely, the size of the filter used in the noise extraction for the luminance plane can be regarded to be different from the size of the filter used in the noise extraction for the chrominance planes, i.e., the range of nearby pixels referenced for the noise extraction executed for the luminance plane is different from the range of nearby pixels referenced in the noise extraction executed for the chrominance planes. This means that the procedure and the method adopted when referencing the signals at the nearby pixels in the noise removal processing executed for the luminance plane are different from the procedure and the method adopted when referencing the signals at the nearby pixels in the noise removal processing executed for the chrominance planes. By removing noise (extracting noise) from the luminance plane and the chrominance planes through procedures corresponding to the individual human visual sensitivity characteristics, as described above, very fine edge preserving smoothing processing is achieved.

(4) Color Space Reverse Conversion

Figure 9:
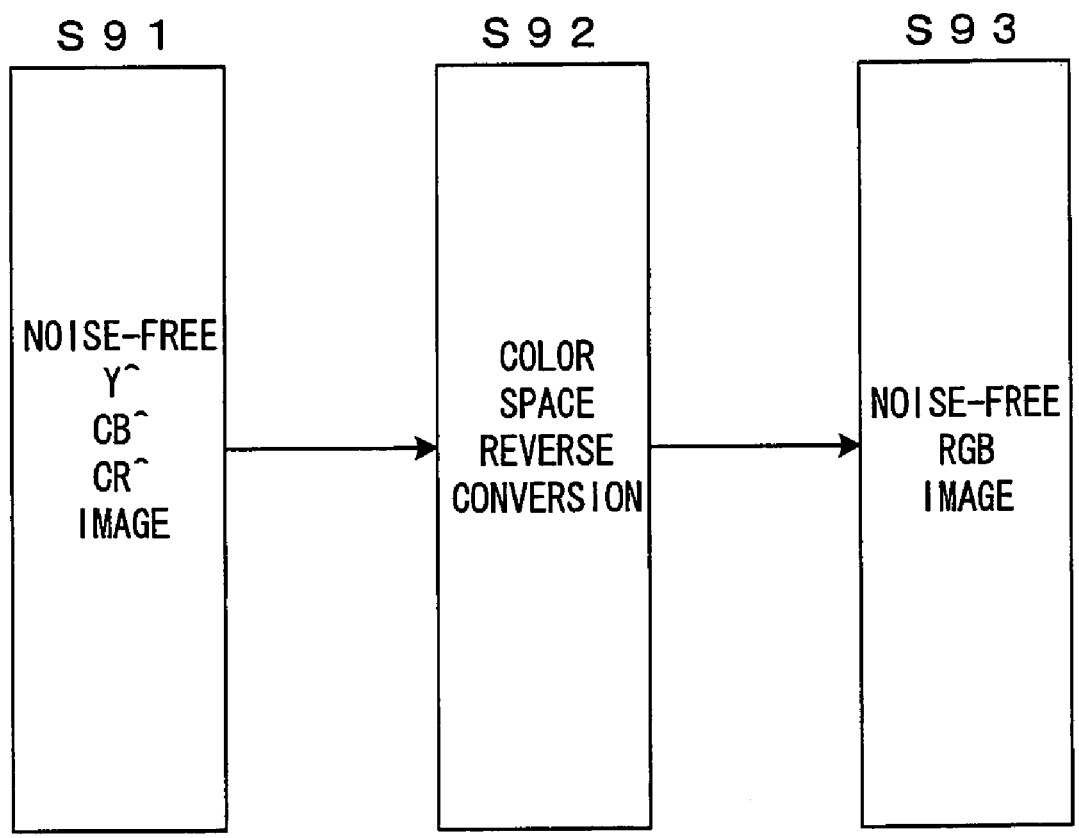

FIG. 9 presents a flowchart of the color space reverse conversion processing executed by the personal computer 1. In step S91, the data Cb^ and Cr^ having undergone the noise removal in step S83 in FIG. 7, and the data YL^ having undergone the noise removal in step S183 in FIG. 8 are obtained. In step S92, the data Y^, Cb^ and Cr^ are reconverted to R', G' and B' in the uniform noise space and the data R', G' and B' are further reverse-converted to R, G and B with the initial linear gradation. The processing executed for purposes of this color space reverse conversion should reverse the color space conversion expressions explained earlier. In step S93, noise-free RGB image data are obtained and are output as required.

The image processing apparatus in the first embodiment structured as described above achieves the following advantages.

(1) By using multi-resolution images expressed in multiple channel band representation facilitating removal of noise manifesting over long cycles, high-quality noise removal is realized through simple processing.
(2) Simple arithmetic processing, which still assures a high level of noise estimating performance, is adopted for the first time in conjunction with sub-band images expressed in multi-resolution presentation and, as a result, all types of noise components, from short-cycle noise to long-cycle noise, can be removed through simple and highly dependable noise removal processing. This enables faster software processing and allows the hardware to assume a smaller circuit scale.
(3) Since the nonlinear conversion processing constituting part of the noise extraction processing is executed by using Gaussian functions corresponding to the origin of random noise, the edge component and the noise component can be separated from each other with a high degree of accuracy.
(4) Through a simple noise extraction processing simply requiring processing method in which processing equivalent to that executed on the chrominance components is to be repeated substantially twice when executing noise from the luminance component, very fine edge-preserving smoothing is realized.
(5) Through the noise removal executed by targeting noise corresponding to a plurality of frequency components in the varying frequency bands, random noise is removed so as to achieve a natural-looking visual effect more easily and more quickly over the prior art.

(6) As data are filtered with a fixed filter of a specific size at each wavelet transformation stage, an effect equivalent to that realized by filtering data with filters of varying sizes is achieved. The lengths of the sides of the image are halved as the resolution is lowered by a single step and thus, an effect equivalent to that realized with a plurality of filters, from small to large in size, is achieved simply by using a single small filter. Thus, the processing volume is reduced, the processing is simplified and higher processing speed is assured.

(7) In the case of the chrominance planes, the Laplacian filter only needs to be applied to data equivalent to the number of pixels 4/3 times the number of pixels constituting the real image. In addition, very simple processing, in which the nonlinear LUT conversion is executed on data equivalent to the number of pixels 4/3 times the number of pixels in the real image and then the filter/subtraction processing is executed, is only required. Through such simple, low-volume processing, a desirable noise removal effect is achieved in which the original image structure is preserved, reliably providing a natural-looking image with no color mottling noise or graininess. Furthermore, the method is regarded to be ideal from the viewpoint of hardware configuration.

(8) Since the noise signal is extracted after converting data to the uniform noise space, the noise can be extracted accurately in a simple structure. Namely, the noise component signal can be extracted with a high level of accuracy simply by extracting the high-frequency signal constituted with the difference between the original signal and the smoothed signal in the data resulting from the uniform noise space conversion, without requiring a separate edge detection unit to be utilized for control purposes. Thus, accurate noise removal is achieved more simply and faster than in the related art.

(9) The noise signal is extracted through nonlinear conversion executed by using an LUT on the arithmetic operation results obtained through fixed filter processing executed on the LL component and the extracted noise signal is subtracted from the LL component. Since this processing simply needs to be individually executed in the wavelet spaces generated at the limited number of stages, the processing procedure is greatly simplified, hardware configuration is facilitated and a superior noise removal effect is assured.

(10) The luminance component image data having undergone the noise removal then undergo similar processing again so as to extract a correction signal by extracting the high-frequency component again. The correction signal thus extracted by executing a similar process again hardly contains any noise component and rather, an edge component indicating a level equal to a slight level of edge component having remained after the attenuation processing executed through the nonlinear conversion, which should not have been subtracted in the first place, is extracted again as the correction signal. Since this correction signal is then added to the noise-free image data, the edge component having been subtracted is reinstated while the image data sustains the noise-free state. Thus, the luminance plane to which the human eye is extremely sensitive compared to the chrominance plane can be handled with utmost care. This ultimately allows grainy noise containing all types of frequency components, which manifest readily in random noise, to be removed without destroying the edges or the texture in the image.

(11) Since the nonlinear conversion is executed by using an LUT, the processing can be executed at high speed without requiring a complicated structure. It is to be noted that threshold value processing instead of the nonlinear conversion may be executed so as to eliminate the need for table referencing and achieve further simplification. An image with an acceptable level of quality can be obtained through such alternative processing as well. More specifically, the alternative processing may be executed as indicated in the following conditional expression. Namely, in the threshold value processing, $\Delta I$ is compared with a predetermined threshold value $\sigma_{th}$, $\Delta I$ is directly used if it is equal to or less than the threshold value $\sigma_{th}$ but $\Delta I$ is regarded to indicate 0 and is thus not used if it is greater than the threshold value $\sigma_{th}$.

[Expression 6]

$$\Delta I_{noise}(x, y) = \begin{cases} \Delta I(x, y) \ldots \text{if } \Delta I(x, y) \le \sigma_{th} \\ 0 \ldots \text{otherwise} \end{cases} \quad (17)$$

It is to be noted that the multi-resolution transformation described above may be executed by adopting a conversion method other than the wavelet transformation. For instance, it may be executed by adopting the DCT pyramid conversion, the Laplacian pyramid conversion or the Steerable pyramid conversion.

Second Embodiment

The optimal extent of noise removal to be executed on the luminance component in particular must be determined carefully. Namely, while a better smoothing effect is achieved by removing noise to a great extent, the resulting image loses sharpness. The opposite outcome results from noise removal executed to a small extent. While intense noise removal may be achieved in the first embodiment by raising the threshold value used in the nonlinear conversion, the use of such a high threshold value may lead to some loss of image structure. For this reason, it is desirable to use a fixed threshold value determined in correspondence to the standard deviation of the noise characteristics ascertained in the uniform image.

The second embodiment provides a method that may be adopted as an alternative to the method described above. While the basic processing is executed on the LL component data alone in the first embodiment, the basic processing is also executed on the high-pass components HH, HL and LH resulting from the wavelet transformation executed at each stage. Namely, the noise extraction processing is executed on noise signals contained in the high-frequency component as well as on noise signals in the real image data and noise signals contained in the low-frequency component in image data with lower resolution.

The image processing apparatus in the second embodiment adopts a structure similar to that of the first embodiment shown in FIG. 1 and its explanation is, therefore, omitted. The processing executed in the second embodiment is similar to that executed in the first embodiment except that the basic processing is executed on the high-pass components HH, HL and LH extracted through the wavelet transformation at each stage and that the high-pass component data having undergone such basic processing are used in the inverse wavelet transformation.

Figure 10:
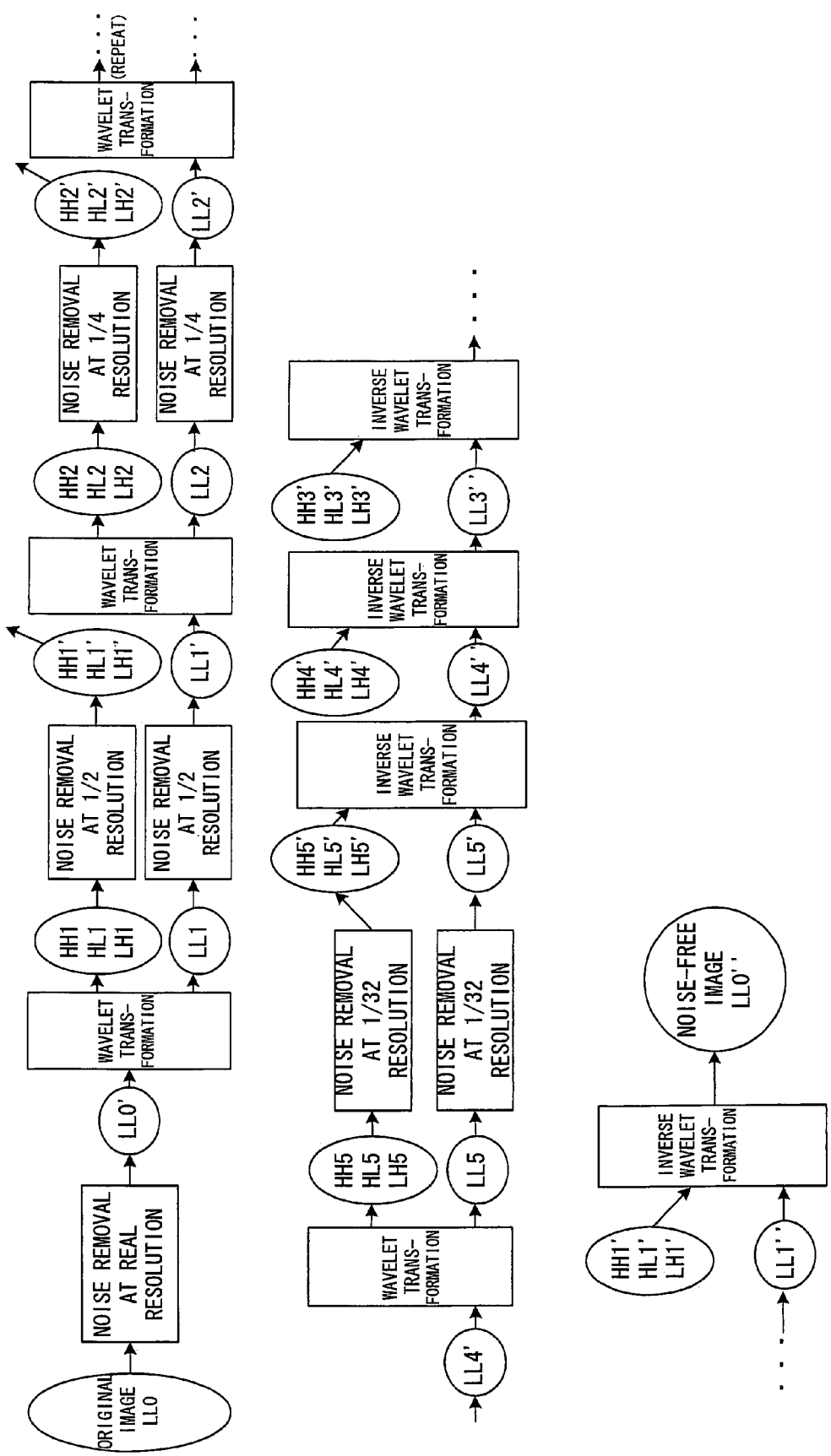
Figure 11:
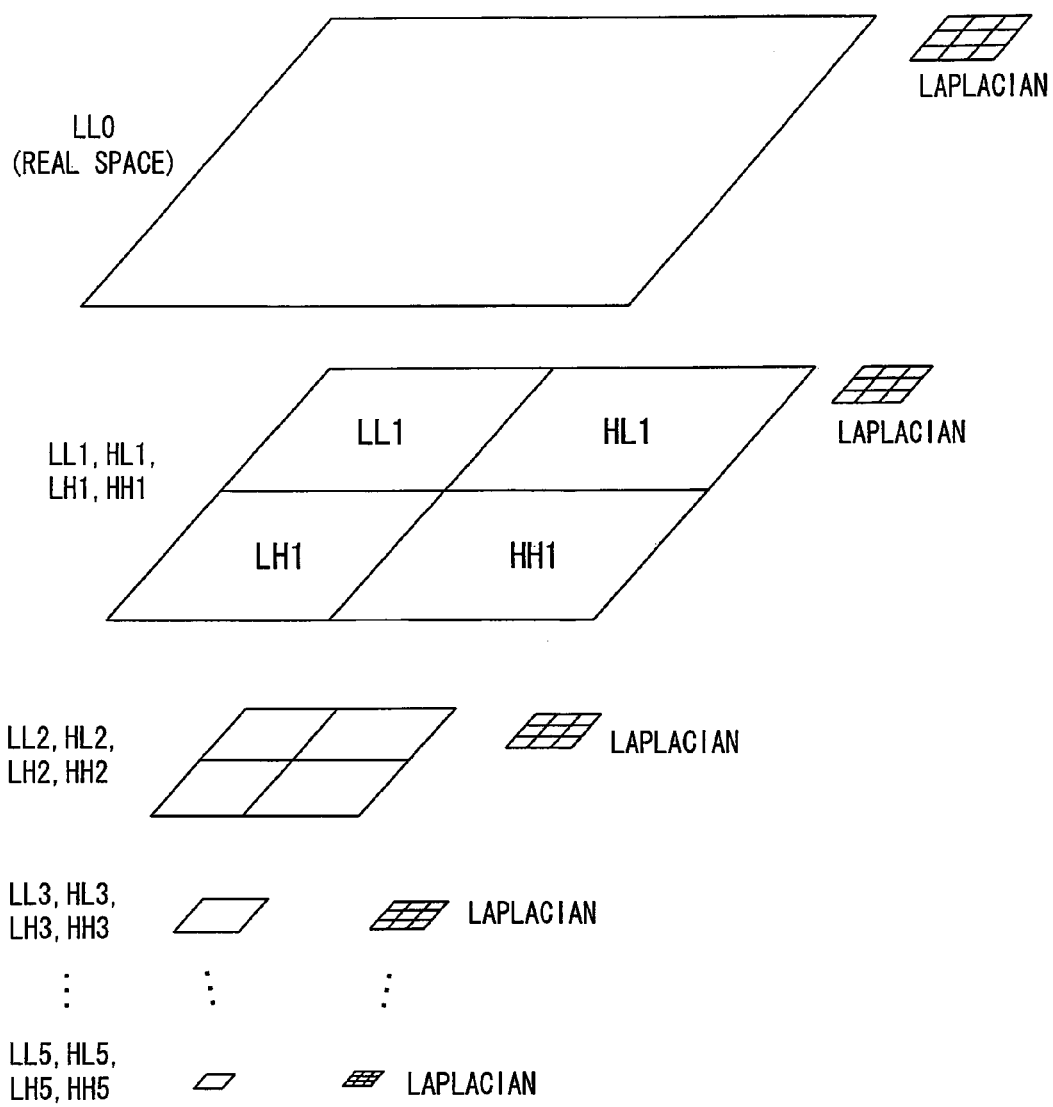

FIG. 10 presents a flowchart of the noise removal processing executed by the personal computer 1 in the second embodiment. FIG. 11 illustrates how noise is removed in the second embodiment. The explanation given in reference to the first embodiment should be referred to for details of the various phases of the processing. The processing executed in the second embodiment as shown in FIG. 10 may be summarized as follows. It is to be noted that the processing may be executed on both the luminance component and the chrominance components, or it may be executed on the chrominance components alone so as to retain image sharpness attributable to the luminance component.
(1) Noise removal in the real space: the basic processing is executed in the real space.
(2) Wavelet transformation: LL0'->LL1, LH1, HL1, HH1
(3) Noise removal at ½ resolution: the basic processing is executed for the LL1, LH1, HL1, and HH1 sub-bands.
(4) Wavelet transformation: LL1'->LL2, LH2, HL2, HH2
(5) Noise removal at ¼ resolution: the basic processing is executed for the LL2, LH2, HL2, and HH2 sub-bands.
(6) Wavelet transformation: LL2'->LL3, LH3, HL3, HH3
(7) Noise removal at ⅛ resolution: the basic processing is executed on LL3, LH3, HL3, and HH3 sub-bands.
(8) Wavelet transformation: LL3'->LL4, LH4, HL4, HH4
(9) Noise removal at 1/16 resolution: the basic processing is executed for the LL4, LH4, HL4, and HH4 sub-bands.
(10) Wavelet transformation: LL4'->LL5, LH5, HL5, HH5
(11) Noise removal at 1/32 resolution: the basic processing is executed for the LL5, LH5, HL5, and HH5 sub-bands.
(12) Inverse wavelet transformation: LL5', LH5', HL5', HH5'->LL4"
(13) Inverse wavelet transformation: LL4", LH4', HL4', HH4'->LL3"
(14) Inverse wavelet transformation: LL3", LH3', HL3', HH3'->LL2"
(15) Inverse wavelet transformation: LL2", LH2', HL2', HH2'->LL1"
(16) Inverse wavelet transformation: LL1", LH1', HL1', HH1'->LL0" (real space)

In addition, if noise removal processing is also to be executed on the luminance component as in the first embodiment, the basic processing for the luminance plane having been explained in reference to the first embodiment is also executed on the high-pass components HH, HL and LH extracted through the wavelet transformation at each stage and the noise-free data corresponding to the high-pass components and the low pass component, having undergone such basic processing, should be used in the inverse wavelet transformation.

The processing executed in the second embodiment may be expressed in the following model expression in correspondence to expression (12) indicating the processing executed in the first embodiment.

[Expression 7]

$$I'(x, y) = I_0(x, y) - \sum_{k=0}^{5} \Delta I_{noise}^{(LLk)}(x, y) - \sum_{k=0}^{5} \Delta I_{noise}^{(LHk)}(x, y) - \sum_{k=0}^{5} \Delta I_{noise}^{(HLk)}(x, y) - \sum_{k=0}^{5} \Delta I_{noise}^{(HHk)}(x, y) \quad (18)$$

In addition to the advantages of the first embodiment, the image processing apparatus in the second embodiment structured as described above achieves the following advantages.
(1) An image quality comparable to that achieved with a bilateral filter known in the related art as a high performance edge-preserving smoothing filter can be achieved through far simpler processing without requiring filtering executed by using a spatial nonlinear conversion coefficient or division processing that cannot be handled in conjunction with a bit shift.
(2) In addition, compared to the processing in the related art in which the σ filter and wavelet transformation are combined, the nonlinear probability model of noise can be handled with a high level of accuracy, and division processing that cannot be handled simply by shifting bits does not need to be executed. Moreover, basically only a single filter is required for high-frequency component extraction, facilitating hardware configuration.

Third Embodiment

Unlike in the first embodiment, in which noise removal is executed in the low-frequency sub-bands alone or in the second embodiment, in which noise removal is executed in both the low-frequency sub-bands and the high-frequency sub-bands, in the third embodiment, noise removal is executed in the high-frequency sub-bands alone. In other words, basic processing for the luminance plane and the chrominance planes is executed on the high-frequency sub-bands HH, HL and LH resulting from wavelet decomposition.

Namely, a method whereby a high-pass filter is applied again to the high-frequency sub-bands (high-pass sub-bands) for noise extraction is adopted in the third embodiment. Through the method, the accuracy with which the noise contained in the high-frequency sub-bands is estimated is improved, resulting in a great improvement in the noise removal performance compared to that achieved through the high-frequency sub-band coring in the related art. With the simplicity of the processing realized through the use of the fixed filter remaining intact, advantages substantially equivalent to those of the first embodiment are assured.

The image processing apparatus in the third embodiment adopts a structure similar to that of the first embodiment shown in FIG. 1 and its explanation is, therefore, omitted.

Figure 15:
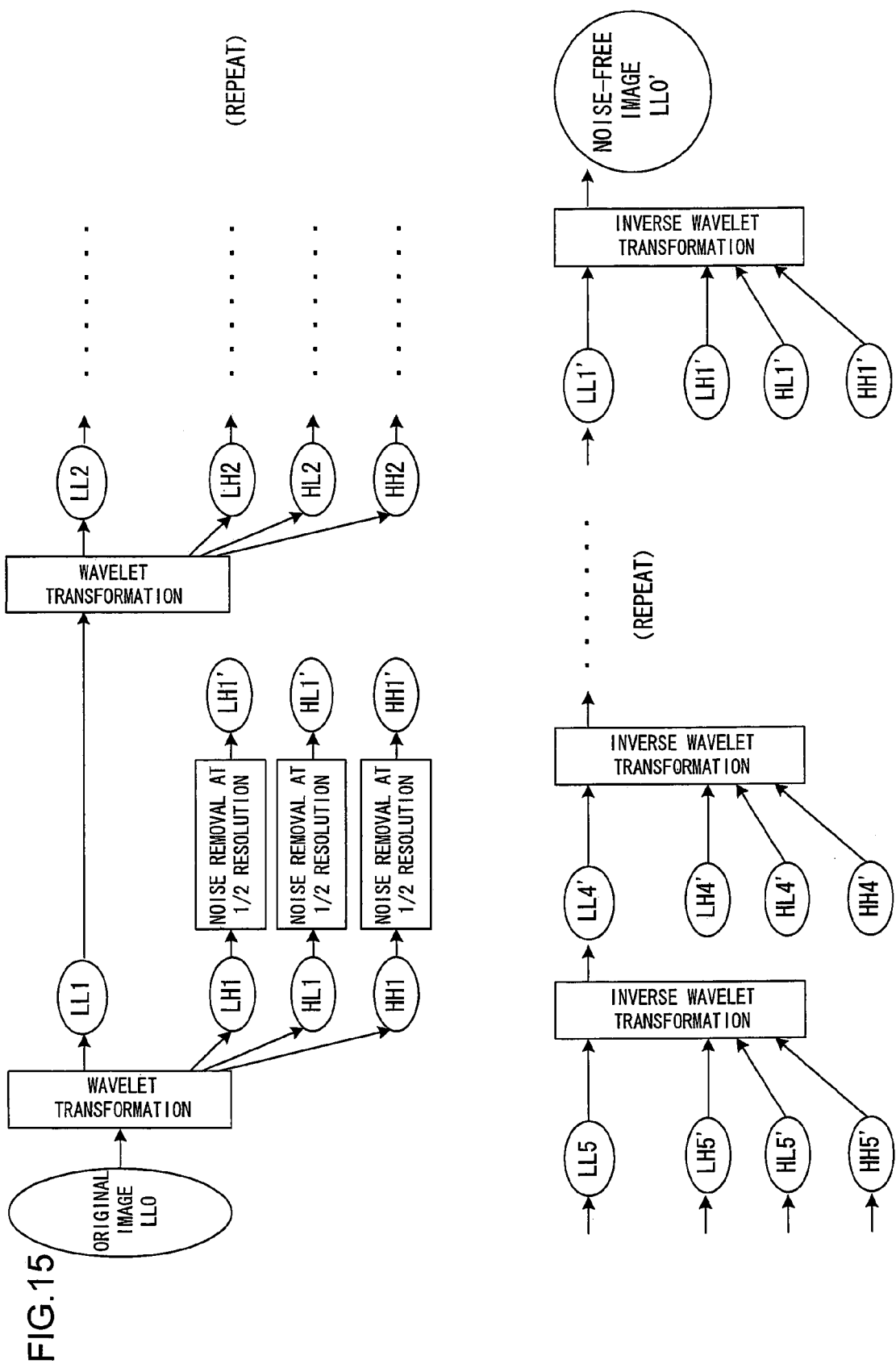

FIG. 15 presents a flowchart of the noise removal processing executed by the personal computer 1 in the third embodiment. Refer to the explanation of the first embodiment for details of the noise removal processing executed for the various high-frequency sub-bands, which are similar to the contents of the basic processing executed in the first embodiment. The processing executed in the third embodiment, as shown in FIG. 15, may be summarized as follows. It is to be noted that the basic processing executed on the luminance plane in the first embodiment is executed for the luminance plane and the basic processing executed on the chrominance planes in the first embodiment is executed for the chrominance planes in the third embodiment.

Since the flows of the noise removal processing executed on the luminance plane and the noise removal processing executed on the chrominance planes are identical and indistinguishable from each other, a single explanation is provided below to cover both processing flows.
(1) Noise removal in the real space: no noise removal processing is executed in the real space.
(2) Wavelet transformation: LL0->LL1, LH1, HL1, HH1
(3) Noise removal at ½ resolution: the basic processing is executed for the LH1, HL1, and HH1 sub-bands.
(4) Wavelet transformation: LL1->LL2, LH2, HL2, HH2
(5) Noise removal at ¼ resolution: the basic processing is executed for the LH2, HL2, and HH2 sub-bands.
(6) Wavelet transformation: LL2->LL3, LH3, HL3, HH3
(7) Noise removal at ⅛ resolution: the basic processing is executed for the LH3, HL3, and HH3 sub-bands.
(8) Wavelet transformation: LL3->LL4, LH4, HL4, HH4
(9) Noise removal at 1/16 resolution: the basic processing is executed for the LH4, HL4, and HH4 sub-bands
(10) Wavelet transformation: LL4->LL5, LH5, HL5, HH5
(11) Noise removal at 1/32 resolution: the basic processing is executed for the LH5, HL5, and HH5 sub-bands
(12) Inverse wavelet transformation: LL5, LH5', HL5', HH5'->LL4'
(13) Inverse wavelet transformation: LL4', LH4', HL4', HH4'->LL3'

(14) Inverse wavelet transformation: LL3', LH3', HL3', HH3'->LL2'
(15) Inverse wavelet transformation: LL2', LH2', HL2', HH2'->LL1'
(16) Inverse wavelet transformation: LL1', LH1', HL1', HH1'->LL0' (real space)

The processing executed in the third embodiment may be expressed as in the following model expression, in correspondence to expression (12) indicating the processing executed in the first embodiment and expression (18) indicating the processing executed in the second embodiment.

[Expression 8]

$$I'(x, y) = I_0(x, y) - \sum_{k=1}^{5} \Delta I_{noise}^{(LHk)}(x, y) - \sum_{k=1}^{5} \Delta I_{noise}^{(HLk)}(x, y) - \sum_{k=1}^{5} \Delta I_{noise}^{(HHk)}(x, y) \quad (19)$$

Fourth Embodiment

In the fourth embodiment, the personal computer 1 executes a specific type of color space conversion on linear RGB image data input thereto, extracts noise in a plurality of bands with a plurality of band filters from the image data resulting from the color space conversion, obtains noise-free image data by subtracting the extracted noise from the original image data having undergone the color space conversion and then obtains noise-free linear RGB image data by executing color space reverse conversion on the noise-free image data. The personal computer 1 thus executes noise removal while assuring an edge-preserving smoothing effect.

While the volume of processing executed in the fourth embodiment is greater than that in the first embodiment, it assures a higher level of freedom and thus has greater potential for allowing a higher performance design. The image processing apparatus in the fourth embodiment adopts a structure similar to that of the first embodiment shown in FIG. 1 and its explanation, therefore, is omitted.

(1) Color Space Conversion

The color space conversion is executed as in the first embodiment.

(2) Chrominance Plane Noise Removal Processing

Next, adaptive noise removal is executed on chrominance signals expressed in the uniform noise space so as to remove the color noise (color mottling noise) containing all types of frequency components that manifest as part of random noise, without destroying the color structure.

In the fourth embodiment, the basic processing having been explained in reference to the first embodiment is executed on the initial signal plane $I_0$ by adjusting the filter size. The noise signals extracted with the filters in varying sizes are then all subtracted from the original signal by executing "3. Noise removal achieved by subtracting noise signal from original signal" for all extracted noise signals (see FIG. 12). Accordingly, the explanation of the basic processing having been provided in reference to the first embodiment should be referred to for details of the basic processing executed in the fourth embodiment. The following is an explanation of the extension processing whereby the basic processing is executed in conjunction with filters of varying sizes.

(Extension Processing)

In the embodiment, the basic processing described above is executed in correspondence to a plurality of frequency components so as to achieve noise removal resulting in a natural-looking image by factoring in noise signals manifesting in a plurality of frequency bands. Namely, such noise removal is achieved by simultaneously executing the basic processing over the plurality of frequency bands and then by assuming an expected value likely to indicate a level close to the value of 0 in correspondence to the plurality of different types of noise signals.

The processing described above utilizes a principle that follows in reverse the fact that the actually measured noise signal is expressed as an expected value in a frequency probability density distribution with regard to the noise component over the full frequency range from a low-frequency to a high-frequency. The expected value can achieve the desired effect by simple addition. For instance, assuming that high-frequency components are extracted over a 3×3 filtering range, a 9×9 filtering range, a 27×27 filtering range, and an 81×81 filtering range, the noise components corresponding to the four bands can be simply subtracted from the original image data.

Noise-free image data I' are obtained by subtracting the noise signal $\Delta I_{noise}$ having been extracted in each band from the original signal as expressed below. The expression below indicates that the noise components having been extracted in the various bands are subtracted from the original signal.

[Expression 9]

$$I'(x, y) = I_0(x, y) - \Delta I_{noise}^{\binom{band1}{3\times3}}(x, y) - \Delta I_{noise}^{\binom{band2}{9\times9}}(x, y) - \Delta I_{noise}^{\binom{band3}{27\times27}}(x, y) - \Delta I_{noise}^{\binom{band4}{81\times81}}(x, y) \quad (20)$$

The Laplacian filters used in conjunction with the individual bands should each be defined with an expression indicating that the smoothing results achieved with a Gaussian blur filter that uses a fixed coefficient in correspondence to a specific filter size among the varying filter sizes 3×3, 9×9, 27×27 and 81×81, from the original image data. The filter size increases in steps by tripling the lengths of the sides. The smoothing ranges may each assume a square shape or a circular shape.

In addition, the plurality of frequency bands in a random noise component effectively influence on another, even if the filters do not assume filtering ranges that are symmetrical along the longitudinal direction and the lateral direction. Accordingly, if the hardware configuration only allows for a line memory large enough to cover several lines, a fairly desirable noise removal effect, which will provide a quite natural-looking image will be achieved through the following processing. For instance, the processing may be executed as expressed below in conjunction with the three-line line memory.

[Expression 10]

$$I'(x, y) = I_0(x, y) - \Delta I_{noise}^{\binom{band1}{3\times3}}(x, y) - \Delta I_{noise}^{\binom{band2}{9\times3}}(x, y) - \Delta I_{noise}^{\binom{band3}{27\times3}}(x, y) - \Delta I_{noise}^{\binom{band4}{81\times3}}(x, y) \quad (21)$$

Through testing, it has been learned that the largest filtering range of approximately 81×81 should be assumed in conjunction with image data constituted with several million pixels through ten million pixels in order to obtain noise-free image data, from which color mottling noise is practically eliminated without destroying the color structure even at a super high sensitivity level, e.g., ISO 6400, at which a great deal of color mottling noise tends to manifest readily.

Figure 12:
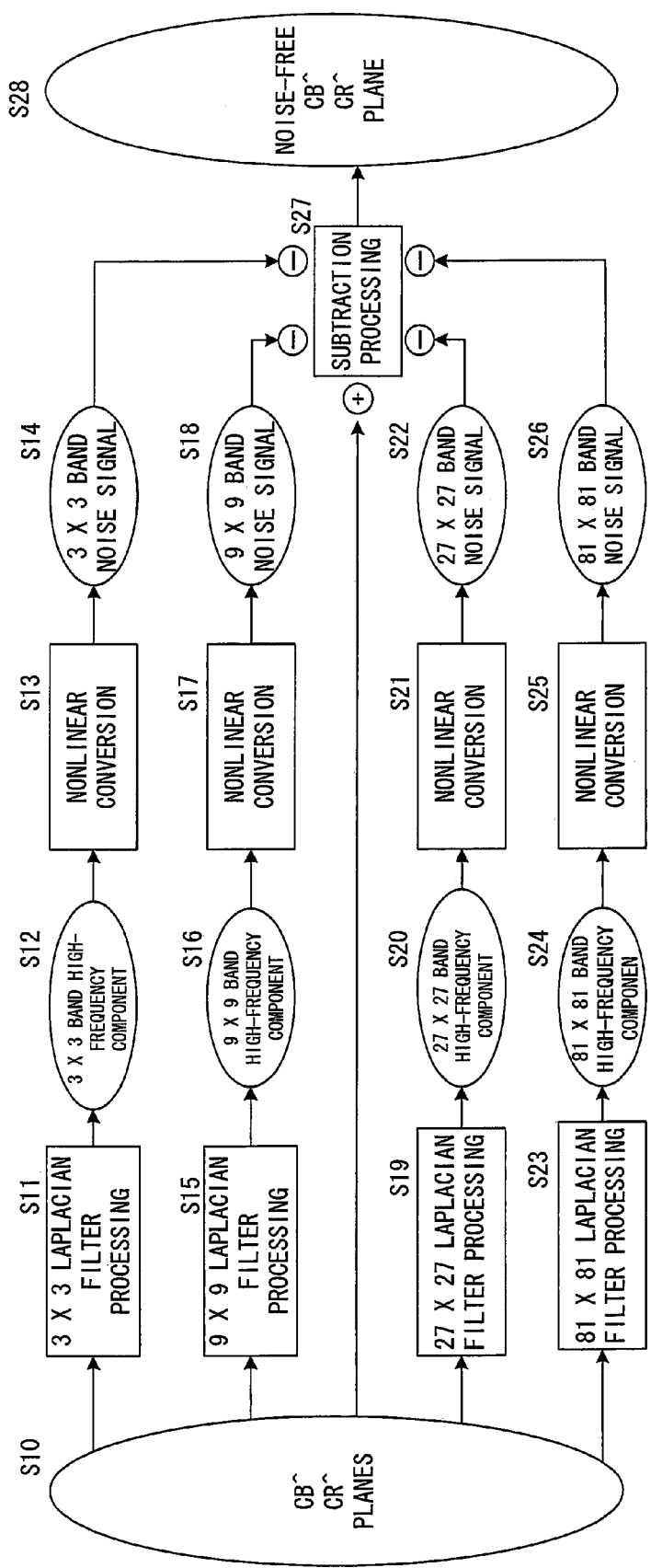

FIG. 12 presents a flowchart of the chrominance plane extension processing executed by the personal computer 1. In step S10, the chrominance plane Cb^, among the uniform noise space image data Y^, Cb^ and Cr^ resulting from the conversion in step S2, is obtained. In step S11, Laplacian filter processing is executed with a 3×3 Laplacian filter and the high-frequency component in the 3×3 band is obtained in step S12. The processing executed in step S11 and step S12 corresponds to "1. processing for extracting the edge and noise signals with the Laplacian filter" having been explained as part of the basic processing executed in the first embodiment.

Next, nonlinear conversion is executed in step S13 and a noise signal in the 3×3 band is obtained in step S14. The processing executed in steps S13 and S14 is equivalent to "2. Noise signal extraction through nonlinear conversion" having been explained as part of the basic processing executed in the first embodiment.

As is the noise signal in the 3×3 band, the noise signal in the 9×9 band is obtained through the processing executed in steps S15 through S18, the noise signal in the 27×27 band is obtained through processing executed in steps S19 through S22 and the noise signal in the 81×81 band is obtained through the processing executed in steps S23 through S26.

In step S27, the noise signals in the 3×3 band, the 9×9 band, the 27×27 band and the 81×81 band having been extracted as described above, are subtracted from the original signal. In step S28, a chrominance plane Cb^ from which noise has been removed through the subtraction processing executed in step S27 is obtained. The processing executed in step S27 is equivalent to incorporating the processing sessions executed for the various bands, each equivalent to "3. Noise removal achieved by subtracting noise signal from original signal" having been explained earlier as part of the basic processing executed in the first embodiment.

It is to be noted that processing similar to that described above is also executed on the chrominance plane Cr^ so as to obtain a noise-free chrominance plane Cr^.

Figure 13:
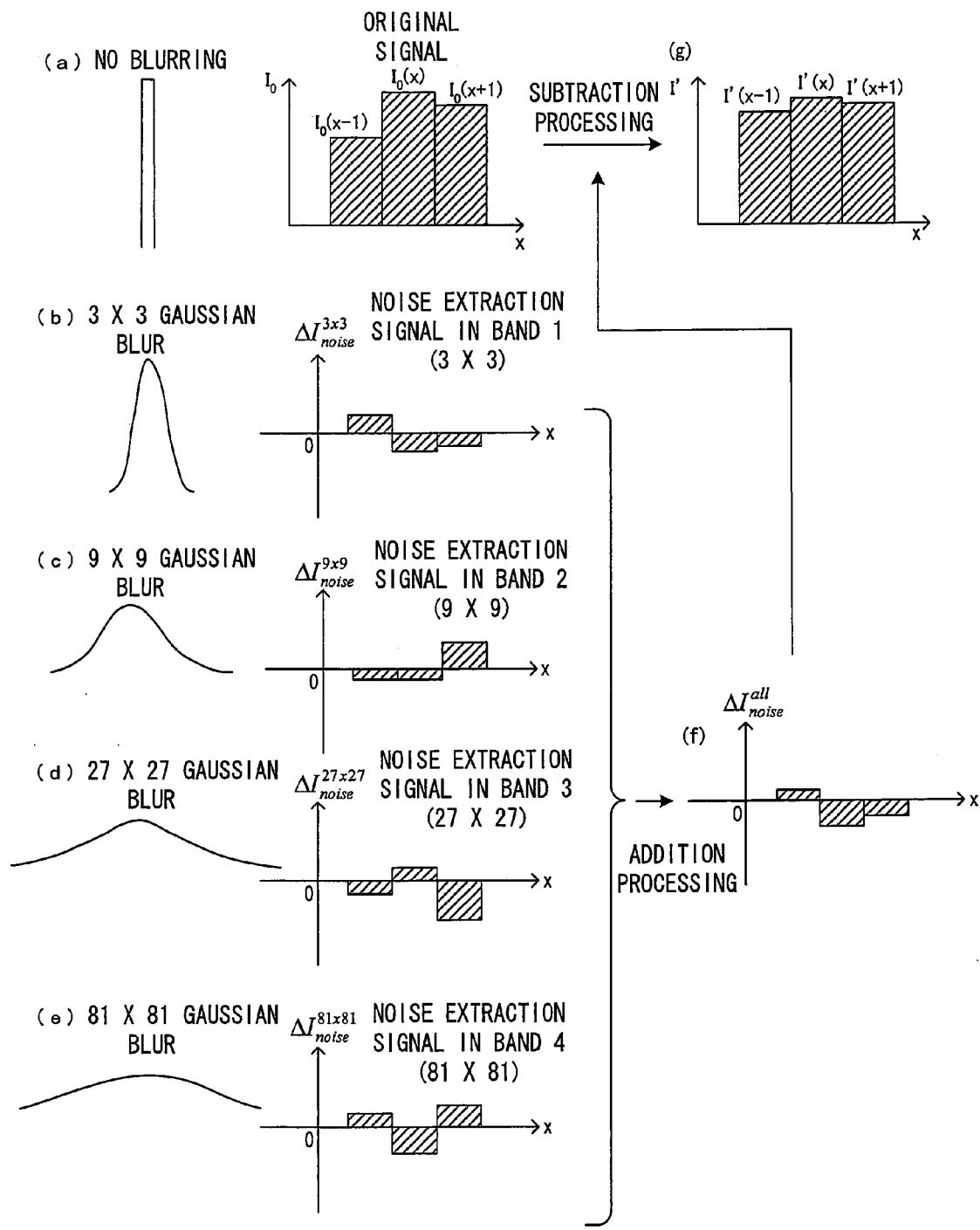

FIG. 13 shows how noise is removed through the extension processing described above. FIG. 13(a) shows data that have not undergone any filter processing, including the original signal $I_0$. FIG. 13(b) shows a noise signal in band 1 (3×3), extracted by using a 3×3 smoothing filter (Gaussian (blur) filter). FIG. 13(c) shows a noise signal in band 2 (9×9) extracted by using a 9×9 smoothing filter (Gaussian (blur) filter). FIG. 13(d) shows a noise signal in band 3 (27×27) extracted by using a 27×27 smoothing filter (Gaussian (blur) filter). FIG. 13(e) shows a noise signal in band 4 (81×81) extracted by using a 81×81 smoothing filter (Gaussian (blur) filter).

FIG. 13(f) shows a signal representing the sum resulting from addition of all the noise signals extracted as shown in FIGS. 13(b) through 13(e). FIG. 13(g) shows the noise-free signal I' resulting from the subtraction of the signal shown in FIG. 13(f) from the original signal in FIG. 13(a). While the flowchart presented in FIG. 12 includes the processing in step S27 through which all the noise signals are individually subtracted, such processing is equivalent to first adding the noise signals to determine their sum and then subtracting the sum from the original signal as shown in FIG. 13(f).

(3) Luminance Plane Noise Removal Processing

Next, the luminance plane noise removal processing is explained. The luminance signal expressed in the uniform noise space undergoes adaptive noise removal so that grainy noise containing all types of frequency components manifesting as part of random noise is removed without destroying edges in the image or the textural structure of the image.

The initial processing executed on the luminance plane, which is equivalent to the "basic processing", is identical to the "basic processing" executed on the chrominance planes as is the case in the first embodiment. However, since the human eye is much more sensitive to the luminance plane than to the chrominance planes, the luminance plane needs to be handled with a higher level of sensitivity. In other words, if the noise signal component is simply subtracted for noise removal, as in the chrominance plane noise removal processing, the resulting luminance plane is likely to look whitish, which will lower the contrast of the entire image. This issue is attributed to the fact that the edge component is sometimes partially subtracted during the processing executed in "3. Noise removal by subtracting noise signal from original signal". In order to correct this problem, the image having undergone phase 3 is used as temporary noise-free image data and an actual noise-free image is obtained by further executing reverse correction processing.

In the fourth embodiment, the additional part of the basic processing executed on the luminance plane in the first embodiment is executed on the temporary noise-free image data I' of the luminance plane obtained through processing similar to the chrominance plane processing, by adjusting the filter size. Then, the high-frequency correction signals obtained with the filters with varying sizes are all added to the noise-free image signal, thereby correcting the noise-free image (see FIG. 14) by executing "6. Noise-free image correction executed by adding high-frequency correction signal to noise-free image signal" in correspondence to the individual filter sizes. Accordingly, the explanation of the basic processing having been provided in reference to the first embodiment should be referred to for details of the basic processing executed in the fourth embodiment. The following is an explanation of the extension processing whereby the basic processing is executed in conjunction with filters of varying sizes.

(Extension Processing)

In the embodiment, the luminance plane basic processing described above is executed in correspondence to a plurality of frequency components so as to achieve noise removal resulting in a natural-looking image by factoring in noise signals manifesting in a plurality of frequency bands. Namely, such noise removal is achieved by simultaneously executing the basic processing over the plurality of frequency bands and then by assuming an expected value likely to indicate a level close to the value of 0 in correspondence to the plurality of different types of noise signals. The expected value can achieve the desired effect by simple addition. For instance, assuming that high-frequency components are extracted over a 3×3 filtering range, a 9×9 filtering range, a 27×27 filtering range, and an 81×81 filtering range, the noise components corresponding to the four bands can be simply subtracted from the original image data.

Noise-free image data I' are obtained by subtracting the noise signal $\Delta I_{noise}$ having been extracted in each band from the original signal as expressed below. Next, the high-frequency correction signals $\Delta I'_{noise}$ are extracted in the individual bands and are added to the noise-free image data I' as indicated in (23) below so as to obtain corrected noise-free image data I".

[Expression 11]

$$I'(x, y) = I_0(x, y) - \Delta I_{noise}^{\binom{band1}{3\times 3}}(x, y) - \Delta I_{noise}^{\binom{band2}{9\times 9}}(x, y) - \Delta I_{noise}^{\binom{band3}{27\times 27}}(x, y) - \Delta I_{noise}^{\binom{band4}{81\times 81}}(x, y) \quad (22)$$

$$I''(x,y) = I'(x,y) + \Delta I_{noise}^{\binom{band\ 1}{3\times 3}}(x,y) + \\ \Delta I_{noise}^{\binom{band\ 2}{9\times 9}}(x,y) + \Delta I_{noise}^{\binom{band\ 3}{27\times 27}}(x,y) + \Delta I_{noise}^{\binom{band\ 4}{81\times 81}}(x,y) \quad (23)$$

Consequently, noise removal, which will provide a natural-looking image with a minimum of grainy noise over the full frequency range while preserving the initial image structure and retaining the initial image contrast, is enabled.

Figure 14:
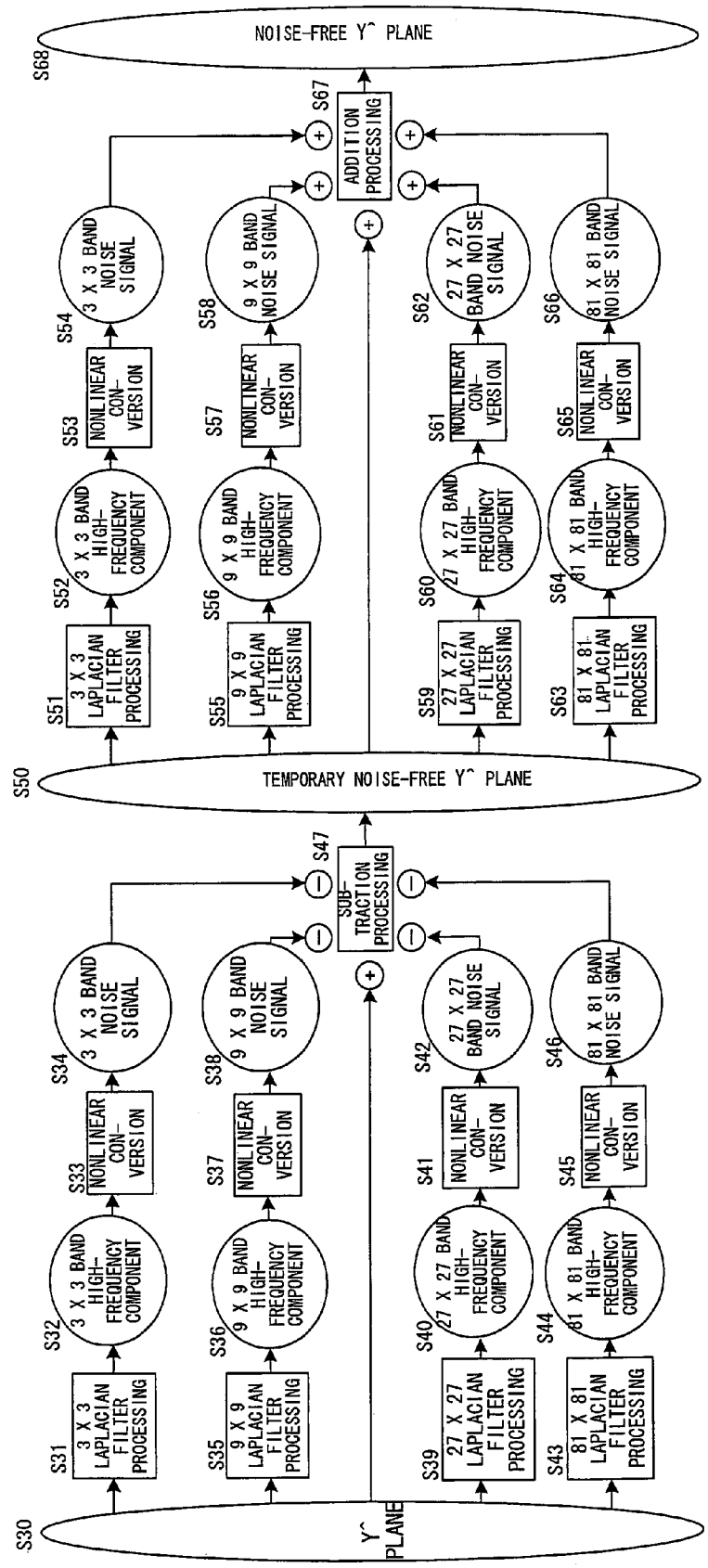

FIG. 14 presents a flowchart of the luminance plane extension processing executed by the personal computer 1. In step S30, the luminance plane Y^ among the uniform noise space image data Y^, Cb^ and Cr^ resulting from the conversion in step S2, is obtained. The processing in step S31 through S47 is executed in a manner similar to that with which the processing on the chrominance plane is executed in steps S11 through S27 in FIG. 12.

In step S50, a temporary luminance plane Y^ (noise-free image data I'), from which noise has been removed through the subtraction processing in step S47, is obtained. Then, the temporary luminance plane Y^ thus obtained undergoes processing in steps S51 through S66. The processing executed in steps S51 through S66 is similar to that in steps S31 through S46, i.e., it is executed in a manner similar to that with which the chrominance plane processing is executed in steps S11 through S26 in FIG. 12.

As a result of the processing executed in steps S51 through S66, high-frequency correction signals $\Delta I'_{noise}$ in the individual bands are obtained. In step S67, the high-frequency correction signals $\Delta I'_{noise}$ in the various bands are added to the temporary luminance plane Y^ (image data I') having undergone the noise removal. In step S68, the luminance plane Y^, with the edge component and the like, having been removed to an excessive extent in step S47 and reinstated through the addition processing in step S67, is obtained. The processing executed in step S67 is equivalent to incorporating the processing sessions executed for the various bands, each equivalent to "6. Noise-free image correction executed by adding high-frequency correction signal to noise-free image signal" having been explained earlier as part of the basic processing executed in the first embodiment.

(4) Color Space Reverse Conversion

Since the color space reverse conversion is executed in a manner similar to that with which the corresponding processing is executed in the first embodiment, as shown in FIG. 9, its explanation is omitted.

The image processing apparatus in the fourth embodiment structured as described above achieves advantages similar to those of the first embodiment, except for the advantages realized through wavelet transformation. It further achieves the following additional advantage. Namely, by extracting noise corresponding to a plurality of frequency components in a plurality of different frequency bands with filters assuming various sizes, the noise removal effect, with which random noise is removed to result in a natural-looking image, can be achieved with a higher level of accuracy over the related art.

(1) It is to be noted that while an explanation is given above in reference to the embodiments on an example in which the processing is executed by the personal computer 1, the present invention is not limited to this example. The processing may instead be executed in an imaging apparatus such as a camera or in another type of apparatus. Namely, the present invention may be adopted in all types of apparatuses that handle image data.

(2) In the embodiments explained above, the noise-free image is corrected by extracting a high-frequency correction signal for the luminance plane. Similar correction processing may also be executed on a chrominance plane. Such correction processing may be expressed as below in correspondence to expressions (11) and (15) described earlier. In the following expressions, $I^{(1)}$ represents the noise-free image data and $I^{(2)}$ represents the corrected noise-free image data. Since it is desirable to stop the chrominance plane noise removal at the subtraction processing stage, noise-free image data having undergone further correction are indicated as $I^{(3)}$.

$$I^{(1)}(x,y) = I(x,y) - \Delta I_{noise}(x,y) \quad (24)$$

$$I^{(2)}(x,y) = I^{(1)}(x,y) + \Delta I^{(1)}_{noise}(x,y) \quad (25)$$

$$I^{(3)}(x,y) = I^{(2)}(x,y) - \Delta I^{(2)}_{noise}(x,y) \quad (26)$$

(3) While the correction processing is executed on the luminance plane once in the embodiments described above, the correction processing may be executed twice as expressed below. In the following expressions, $I^{(1)}$ represents the noise-free image data and $I^{(2)}$ represents the corrected noise-free image data. $I^{(3)}$ represents noise-free image data resulting from subsequent noise removal and $I^{(4)}$ represents the noise-free image data having undergone the subsequent correction. In addition, the processing may be executed more than twice. The correction processing executed on a chrominance plane, too, may be executed repeatedly as well.

$$I^{(1)}(x,y) = I(x,y) - \Delta I_{noise}(x,y) \quad (27)$$

$$I^{(2)}(x,y) = I^{(1)}(x,y) + \Delta I^{(1)}_{noise}(x,y) \quad (28)$$

$$I^{(3)}(x,y) = I^{(2)}(x,y) - \Delta I^{(2)}_{noise}(x,y) \quad (29)$$

$$I^{(4)}(x,y) = I^{(3)}(x,y) + \Delta I^{(3)}_{noise}(x,y) \quad (30)$$

The present invention is not limited to the specific conversion expressions used when converting data into the uniform noise space in the embodiments. Data may be converted to a uniform noise space through a different conversion method. For instance, as long as shot noise or the like, the level of which changes in proportion to the square root of the signal value, is converted to noise in a space where it takes a constant value relative to the signal value, the data may be converted by using a lookup table created based upon actually measured data instead of by using analytical expressions.

(5) While the data are converted by using nonlinear conversion expressions in the embodiments described above, the present invention is not limited to this example and data may be converted by adopting different conversion expressions with different parameters and the like. In other words, data may be converted based upon any conversion expression as long as it makes it possible to separate the noise component from the edge component and the like.

(6) While filters with the 3×3 size, the 9×9 size, the 27×27 size and the 81×81 size are used in the fourth embodiment, the present invention is not limited to this example and filter processing may be executed by using filters assuming other sizes. In addition, instead of using filters in four different sizes, filters in a greater number of sizes or a smaller number of sizes may be used.

(7) While five-stage wavelet transformation is executed in the first through third embodiment, the present invention is not limited to this example and the wavelet transformation may be executed over a number of stages greater than or smaller than five.

While the invention has been particularly shown and described with respect to preferred embodiments and variations thereof by referring to the attached drawings, the present invention is not limited to these examples and it will be understood by those skilled in the art that various changes in form and detail may be made therein without departing from the scope and teaching of the invention.

The disclosure of the following priority application is herein incorporated by reference:
Japanese Patent Application No. 2005-101545 filed Mar. 31, 2005

The invention claimed is:

1. An image processing method for removing noise contained in an image, comprising:
inputting an original image constituted with a plurality of pixels;
extracting a first high-frequency component through first high-pass filter processing executed on the original image;
extracting a second high-frequency component through second high-pass filter processing executed on the extracted first high-frequency component;
extracting a noise component by separating the noise component through nonlinear conversion processing executed on the extracted second high-frequency component; and
removing noise in the original image based upon the extracted noise component, wherein
the nonlinear conversion processing is attenuation processing whereby a non-noise component contained in the second high-frequency component is attenuated by multiplying the second high-frequency component by a weighted Gaussian coefficient having an argument of a value resulting from a comparison of the second high-frequency component with a predetermined threshold value.

2. An image processing method according to claim 1, wherein:
a specific type of bandpass filter processing including the first high-pass filter processing is executed on the original image to generate a plurality of high-frequency band-limited images corresponding to the first high-frequency component, and the plurality of high-frequency band-limited images have resolution levels that are lowered in sequence;
the second high-frequency component is extracted from each of the high-frequency band-limited images by individually executing the second high-pass filter processing on the plurality of high-frequency band-limited images having been generated;
the noise component contained in each of the high-frequency band-limited images is extracted by separating the noise component through the nonlinear conversion processing executed on the extracted second high-frequency component; and
the noise in the original image is removed based upon the noise component extracted from each of the high-frequency band-limited images.

3. An image processing method according to claim 2, wherein:
the plurality of high-frequency band-limited images are a set of high-frequency band images obtained through a multi-resolution transformation executed on the original image, and the plurality of high-frequency band-limited images have resolution levels that are lowered in sequence.

4. An image processing method according to claim 3, wherein:
the plurality of high-frequency band-limited images are a set of high-pass component sub-band images resulting from wavelet transformation.

5. An image processing method according to claim 2, wherein:
the second high-pass filter processing is executed on the plurality of high-frequency band-limited images by using filters of uniform size.

6. An image processing method for removing noise contained in an image, comprising:
obtaining the image; and
performing a processing operation on the image, comprising:
extracting a first high-frequency component by applying a high-pass filter to the obtained image;
extracting a noise component from the extracted first high-frequency component through non-linear conversion;
subtracting the extracted noise component from the image;
extracting a second high-frequency component from the image from which the noise component has been subtracted, by applying the high-pass filter with the same characteristics as in the extraction of the first high-frequency component;
extracting a correction component from the second high-frequency component through non-linear conversion having the same characteristics used in the extraction of the noise component; and
adding the extracted correction component to the image from which the noise component has been subtracted to generate a resultant image, wherein
the processing operation is repeated at least once, in which each repetition comprises performing the processing operation on the resultant image of a previous processing operation,
the nonlinear conversion processing in the extraction of both the noise and the correction component is attenuation processing whereby a non-noise component contained in the first high-frequency component is attenuated by multiplying the first high-frequency component by a weighted Gaussian coefficient having an argument of a value resulting from a comparison of the first high-frequency component with a predetermined threshold value, and
an edge component corresponding to overcorrection contained in the second high frequency component is attenuated by multiplying the second high frequency component by another weighted Gaussian coefficient having an argument of a value resulting from a comparison of the second high-frequency component with the identical threshold value as defined in the noise extraction processing.

7. An image processing method according to claim 6, wherein:
the image is constituted with a luminance component and a chrominance component; and
processing for adding the correction component to the image from which the noise component has been subtracted is executed for an image corresponding to the luminance component alone.

8. An image processing method according to claim 1, wherein:
a standard deviation value determined in a uniform image area of the original image is used as the predetermined threshold value.

9. A non-transitory computer-readable medium storing a computer program product, comprising:
an image processing program that enables a computer or an image processing apparatus to execute an image processing method according to claim 1.

10. An image processing apparatus, comprising:
a computer that executes an image processing method according to claim 1.

* * * * *